(12) United States Patent
Xu et al.

(10) Patent No.: US 12,040,688 B2
(45) Date of Patent: Jul. 16, 2024

(54) POWER TOOL AND CONTROL METHOD THEREOF

(71) Applicant: Nanjing Chervon Industry Co., Ltd., Nanjing (CN)

(72) Inventors: Zhen Xu, Nanjing (CN); Dezhong Yang, Nanjing (CN); Yanqing Xu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 180 days.

(21) Appl. No.: 17/751,251

(22) Filed: May 23, 2022

(65) Prior Publication Data

US 2022/0286018 A1    Sep. 8, 2022

Related U.S. Application Data

(63) Continuation of application No. PCT/CN2020/130794, filed on Nov. 23, 2020.

(30) Foreign Application Priority Data

Dec. 31, 2019 (CN) .......................... 201911425767.8
Aug. 10, 2020 (CN) .......................... 202010793310.9

(51) Int. Cl.
*H02P 27/08* (2006.01)
*B25F 5/02* (2006.01)
(Continued)

(52) U.S. Cl.
CPC ............... *H02K 7/145* (2013.01); *B25F 5/02* (2013.01); *H02K 11/33* (2016.01); *H02P 27/085* (2013.01)

(58) Field of Classification Search
CPC .. H02P 21/22; H02P 21/18; H02P 6/08; H02P 27/08; H02P 27/085;
(Continued)

(56) References Cited

U.S. PATENT DOCUMENTS 9,337,763 B2 * 5/2016 Funabashi ............... H02P 23/20
10,070,164 B2 * 9/2018 Li ....................... H04N 21/2405
(Continued)

FOREIGN PATENT DOCUMENTS

CN        1163506 A    10/1997
CN      105391351 A     3/2016
(Continued)

OTHER PUBLICATIONS

ISA/CN, International Search Report issued on PCT application No. PCT/CN2020/130794, dated Feb. 24, 2021, 4 pages.
(Continued)

*Primary Examiner* — Thai T Dinh
(74) *Attorney, Agent, or Firm* — Greenberg Traurig, LLP

(57) ABSTRACT

A power tool includes a functional element, a motor, a power supply module, a driver circuit, and a control module. The control module is electrically connected to the driver circuit and configured to output a control signal to the driver circuit to control the driver circuit. The control module is configured to: in the case where the power tool is in a first operation stage, control the driver circuit in a first control mode so that a voltage of the motor varies with a rotor position of the motor in a square wave; and in the case where the power tool is in a second operation stage, control the driver circuit in a second control mode so that the voltage of the motor varies with the rotor position of the motor in a sine wave or a saddle wave.

17 Claims, 15 Drawing Sheets

(51) Int. Cl.
*H02K 7/14* (2006.01)
*H02K 11/33* (2016.01)
*H02P 6/08* (2016.01)
*H02P 21/18* (2016.01)
*H02P 21/22* (2016.01)

(58) Field of Classification Search
CPC .... H02P 2209/11; H02P 2205/01; B25F 5/02; B25F 5/00; H02K 11/33; H02K 7/145
See application file for complete search history.

(56) References Cited

U.S. PATENT DOCUMENTS

| | | | | |
|---|---|---|---|---|
| 10,680,494 | B2* | 6/2020 | Lewis | H02P 6/08 |
| 10,903,775 | B2* | 1/2021 | Hosokawa | H02P 29/02 |
| 11,070,164 | B2* | 7/2021 | Wang | B23D 49/10 |
| 11,689,124 | B2* | 6/2023 | Rajzer | H02P 6/12 318/17 |
| 2007/0267990 | A1* | 11/2007 | Abolhassani | H02P 6/153 318/432 |
| 2010/0176757 | A1 | 7/2010 | Yamakawa et al. | |
| 2017/0373615 | A1* | 12/2017 | Lewis | H02K 7/145 |

FOREIGN PATENT DOCUMENTS

| | | | | |
|---|---|---|---|---|
| CN | 106374787 | A | | 2/2017 |
| CN | 110171296 | A | | 8/2019 |
| CN | 110572089 | A | * | 12/2019 |
| CN | 110572089 | A | | 12/2019 |
| EP | 0961396 | A1 | | 12/1999 |
| EP | 3121956 | A1 | * | 1/2017 ............. H02P 27/08 |
| EP | 3121956 | A1 | | 1/2017 |
| JP | 2002233183 | A | | 8/2002 |
| WO | 2019184975 | A1 | | 10/2019 |
| WO | WO-2019184975 | A1 | * | 10/2019 ................ B25F 5/00 |

OTHER PUBLICATIONS

ISA/CN, English translation of International Search Report issued on PCT application No. PCT/CN2020/130794, dated Feb. 24, 2021, 3 pages.
ISA/CN, Written Opinion issued on PCT application No. PCT/CN2020/130794, dated Feb. 24, 2021, 3 pages.
ISA/CN, English translation of Written Opinion issued on PCT application No. PCT/CN2020/130794, dated Feb. 24, 2021, 3 pages.
EPO, extended European search report issued on European patent application No. 20909406.9, dated Nov. 30, 2022, 7 pages.

\* cited by examiner

POWER TOOL AND CONTROL METHOD THEREOF

RELATED APPLICATION INFORMATION

This application is a continuation of International Application Number PCT/CN2020/130794, filed on Nov. 23, 2020, through which this application also claims the benefit under 35 U.S.C. § 119(a) of Chinese Patent Application No. 201911425767.8, filed on Dec. 31, 2019, and Chinese Patent Application No. 202010793310.9, filed on Aug. 10, 2020, all of which are incorporated herein by reference in their entirety.

BACKGROUND

As one of the most widely used tools at present, power tools are powered by motors to work, are easy to operate, can greatly reduce labor intensity, and thus are widely used in construction, gardening, housing decoration, automobiles, machinery, electricity, bridges and other fields.

At present, a control strategy of a brushless direct current (DC) motor for the power tools mainly adopts a square wave control mode. Although the square wave control mode has advantages of low price, simple matching and low energy consumption, the problem of low speed and efficiency and output characteristics to be improved urgently exists when the square wave control mode is adopted for a heavy load.

SUMMARY

A power tool includes a functional element, a motor, a power supply module, a driver circuit, and a control module. The motor is configured to drive the functional element to rotate, where the motor includes a stator and a rotor. The power supply module is configured to supply power to the motor. The driver circuit is electrically connected to the motor and the power supply module and configured to apply a voltage of the power supply module to the motor. The control module is electrically connected to the driver circuit and configured to output a control signal to the driver circuit to control the driver circuit, where the control module is configured to perform steps described below. In the case where the power tool is in a first operation stage, the driver circuit is controlled in a first control mode so that a voltage of the motor varies with a rotor position of the motor in a square wave. In the case where the power tool is in a second operation stage, the driver circuit is controlled in a second control mode so that the voltage of the motor varies with the rotor position of the motor in a sine wave or a saddle wave.

In one example, the control module is configured to perform steps described below. Whether the power tool is in the first operation stage or the second operation stage is determined according to a load-related parameter of the motor.

In one example, the load-related parameter of the motor includes at least one of a current of the motor, a rotational speed of the motor, torque of the motor, or acceleration of the power tool.

In one example, the control module is configured to perform steps described below. In the case where a rotational speed of the motor is less than or equal to a first preset rotational speed threshold and a current of the motor is greater than or equal to a first preset current threshold, the control module is configured to determine that the power tool is in the second operation stage and be switched from the first control mode to the second control mode.

In one example, the control module is configured to perform steps described below. In the case where the rotational speed of the motor is greater than or equal to a second preset rotational speed threshold and the current of the motor is less than or equal to a second preset current threshold, the control module is configured to determine that the power tool is in the first operation stage and be switched from the second control mode to the first control mode.

In one example, the second preset current threshold is less than the first preset current threshold, and the second preset rotational speed threshold is greater than the first preset rotational speed threshold.

In one example, the control module is configured to perform steps described below. In the first control mode, a first pulse-width modulation (PWM) control signal is outputted to the driver circuit. In the second control mode, a second pulse-width modulation (PWM) control signal is outputted to the driver circuit. A duty cycle of the second PWM signal varies with the rotor position of the motor.

In one example, the control module is configured to perform steps described below. A switching process is performed before the control module is switched from the first control mode to the second control mode. In the switching process, output of the first PWM control signal to the driver circuit is suspended so that the motor stops driving.

In one example, the control module is configured to start to perform the switching process at a preset position of a rotor.

In one example, variation of the rotational speed of the motor before and after the switching process is less than a preset threshold.

In one example, the control module is configured to, in the switching process, acquire a switched initial duty cycle of the second PWM control signal according to a preset duration, the rotational speed of the motor, the rotor position of the motor, and a bus current or bus voltage of the motor.

In one example, the preset duration is a duration during which the control module performs the switching process.

An example provides a control method of a power tool, where the power tool includes a motor, a driver circuit configured to drive the motor, and a control module configured to control the driver circuit, and the control method of a power tool includes steps described below. Whether the power tool is in a first operation stage or a second operation stage is determined. In the case where the power tool is in the first operation stage, the driver circuit is controlled in a first control mode so that an input voltage of the motor varies with a rotor position of the motor in a square wave. In the case where the power tool is in the second operation stage, the driver circuit is controlled in a second control mode so that the input voltage of the motor varies with the rotor position of the motor in a sine wave or a saddle wave.

In one example, whether the power tool is in the first operation stage or the second operation stage is determined according to a load-related parameter of the motor.

In one example, the load-related parameter of the motor includes at least one of a current of the motor, a rotational speed of the motor, torque of the motor, or acceleration of the power tool.

In one example, in the case where a rotational speed of the motor is less than or equal to a first preset rotational speed threshold and a current of the motor is greater than or equal to a first preset current threshold, it is determined that the power tool is in the second operation stage and the control module is switched from the first control mode to the second control mode.

In one example, in the case where the rotational speed of the motor is greater than or equal to a second preset rotational speed threshold and the current of the motor is less than or equal to a second preset current threshold, it is determined that the power tool is in the first operation stage and the control module is switched from the second control mode to the first control mode.

In one example, the second preset current threshold is less than the first preset current threshold, and the second preset rotational speed threshold is greater than the first preset rotational speed threshold.

In one example, in the first control mode, a first PWM control signal is outputted to the driver circuit. In the second control mode, a second PWM control signal is outputted to the driver circuit. A duty cycle of the second PWM signal varies with the rotor position of the motor.

In one example, a switching process is performed before switching from the first control mode to the second control mode. In the switching process, output of the first PWM control signal to the driver circuit is suspended so that the motor stops driving.

In one example, the switching process starts to be performed at a preset position of a rotor.

In one example, variation of the rotational speed of the motor before and after the switching process is less than a preset threshold.

In one example, in the switching process, a switched initial duty cycle of the second PWM control signal is acquired according to a preset duration, the rotational speed of the motor, the rotor position of the motor, and a bus current or bus voltage of the motor.

In one example, the preset duration is a duration during which the control module performs the switching process.

An example provides a method for switching motor control modes, where the control modes include a first control mode and a second control mode. In the first control mode, a first PWM control signal is outputted to drive a motor so that an input voltage of the motor varies with a rotor position of the motor in a square wave. In the second control mode, a second PWM control signal is outputted to drive the motor so that the input voltage of the motor varies with the rotor position of the motor in a sine wave or a saddle wave. A method for switching motor control modes through which the motor is switched from the first control mode to the second control mode includes steps described below. Whether a rotor of the motor is at a preset position is determined. In the case where it is determined that the rotor of the motor is at the preset position, steps described below are performed. The motor is stopped to be driven. A bus voltage or bus current of the motor and a rotational speed of the motor before switching are acquired. A rotational speed of the motor and a rotor position after a preset duration are calculated according to the preset duration, the rotational speed of the motor before the switching, and the preset position of the rotor. An initial duty cycle of the second PWM control signal after the switching is obtained through calculating or looking up a table according to the calculated rotational speed of the motor and the rotor position after the preset duration and the bus voltage or bus current of the motor.

In one example, whether a power tool is in a first operation stage or a second operation stage is determined according to a load-related parameter of the motor. In the case where the power tool is in the first operation stage, the motor is controlled and driven in the first control mode. In the case where the power tool is in the second operation stage, the motor is controlled and driven in the second control mode.

In one example, the load-related parameter of the motor includes at least one of a current of the motor, the rotational speed of the motor, torque of the motor, or acceleration of the power tool.

In one example, in the case where the rotational speed of the motor is less than or equal to a first preset rotational speed threshold and a current of the motor is greater than or equal to a first preset current threshold, it is determined that the power tool is in the second operation stage and a control module is switched from the first control mode to the second control mode.

In one example, in the case where the rotational speed of the motor is greater than or equal to a second preset rotational speed threshold and the current of the motor is less than or equal to a second preset current threshold, it is determined that the power tool is in the first operation stage and the control module is switched from the second control mode to the first control mode.

In one example, the second preset current threshold is less than the first preset current threshold, and the second preset rotational speed threshold is greater than the first preset rotational speed threshold.

In one example, a duty cycle of the second PWM signal varies with the rotor position of the motor.

In one example, a switching process is performed before switching from the first control mode to the second control mode. In the switching process, output of the first PWM control signal to a driver circuit is suspended so that the motor stops driving.

In one example, the switching process starts to be performed at the preset position of the rotor.

In one example, in the case where the driver circuit is controlled by the second PWM control signal with the initial duty cycle, variation between a rotational speed of the motor and the rotational speed of the motor before the switching process is less than a preset threshold.

In one example, the preset duration is a duration during which the control module performs the switching process.

DETAILED DESCRIPTION

Figure 1:
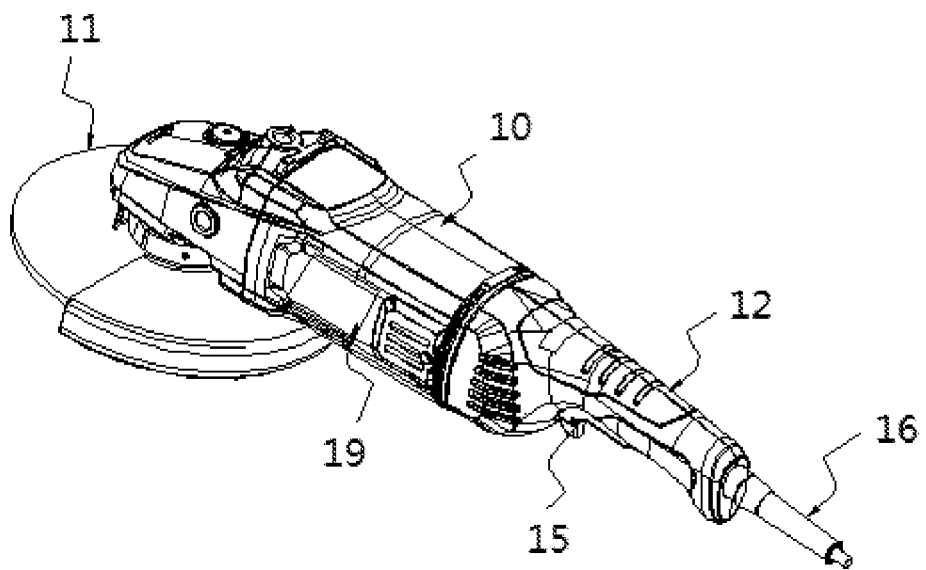
FIG. 1 is a structural view of an angle grinder as specific example of a power tool according to an example of the present application.
Figure 3:
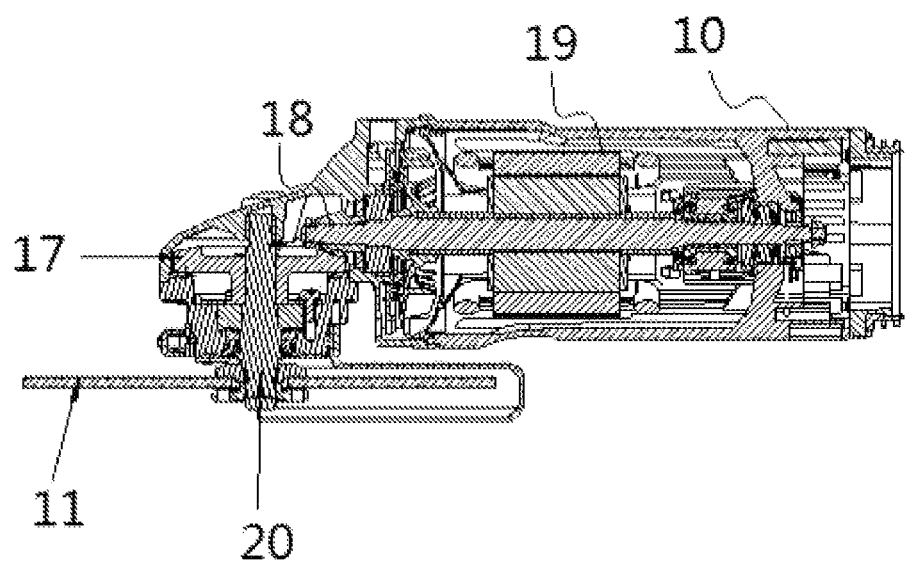
FIG. 3 is a schematic view of an internal structure of a housing of an angle grinder as specific example of a power tool according to an example of the present application.

FIG. 1 is a structural view of an angle grinder as a specific example of a power tool according to the present application. As shown in FIGS. 1 and 3, the angle grinder mainly includes a housing 10, a functional element 11, a holding portion 12, an operating device 15, a motor 19, and a power supply module. The housing 10 is provided with an inner cavity, the motor 19 is disposed in the inner cavity, and the inner cavity further accommodates a transmission device 17 and other electronic components such as a circuit board. A front end of the housing 10 is used for installing the functional element 11. A rotating shaft of the motor 19 drives the functional element 11 through the transmission device 17 and an output shaft 20. Different functional elements 11 may be adopted for different power tools. Optionally, the functional element 11 in this example may adopt a grinding blade so as to achieve grinding or cutting functions. The functional element 11 may be provided with a shield 16 so as to achieve an object of safety protection. The housing 10 is provided with the holding portion 12 which is convenient for a user to hold. The power supply module supplies power to the motor 19, and preferably, the power supply module is connected to a power supply through a power cord 16 so as to supply power to the motor 19. The operating device 15 is used for speed regulation of the motor 19, and the operating device 15 may be, but not limited to, a trigger, a knob, a sliding mechanism, and the like. In this example, the operating device 15 is configured as the sliding mechanism.

Figure 2:
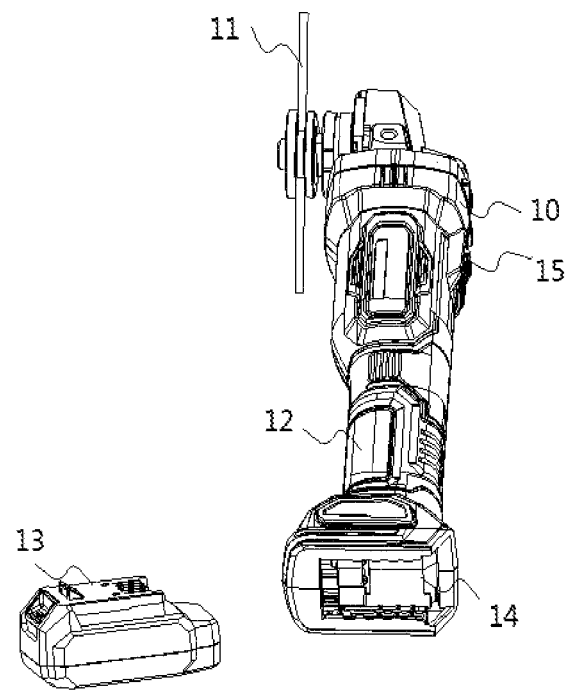
FIG. 2 is a structural view of an angle grinder as specific example of a power tool powered by a battery pack according to an example of the present application.

FIG. 2 is a structural view of an angle grinder as a specific example of a power tool powered by a battery pack according to the present application. An angle grinder structure in FIG. 2 is basically the same as an angle grinder structure in FIG. 1. A difference is that in the angle grinder structure in FIG. 2, a battery pack 13 is connected to the housing 10 through a battery pack joint 14 so as to supply power to the motor 19.

For the convenience of description, a case where the power tool is the angle grinder is used as an example. Apparently, the power tool may also be other tools that can convert outputted torque into other forms of motion. These tools may be configured to grind workpieces, such as sanders; these tools may also be configured to cut workpieces, such as reciprocating saws, circular saws, and jig saws; these tools may also be configured to make an impact, such as electric hammers; these tools may also be garden tools, such as pruning machines and chainsaws; these tools may also be vehicle-type power tools, such as riding lawn mowers; and these tools may also be used for other purposes, such as blenders. As long as these power tools include a motor 120 that drives movement of working parts, the essence of technical solutions disclosed below may be adopted.

Figure 4:
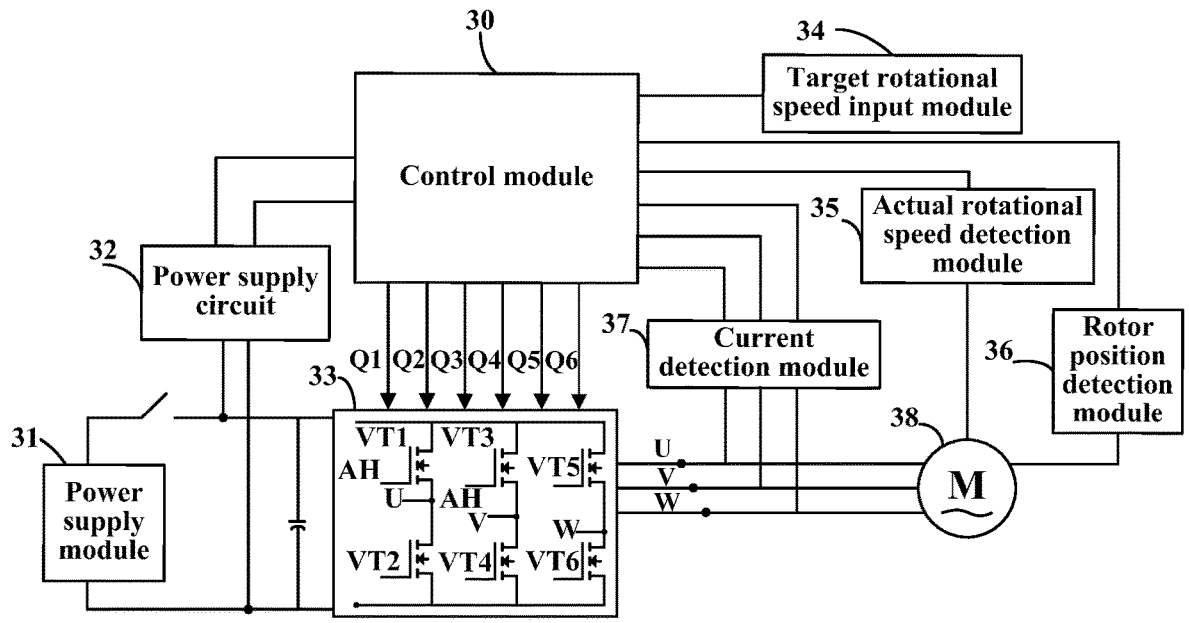
FIG. 4 is a circuitry block diagram of an implementation of an example power tool.

As shown in FIG. 4, a power tool includes a functional element 11, a motor 38, a power supply module 31, a driver circuit 33, and a control module 30. The motor 38 is configured to drive the functional element 11 to rotate, where the motor 38 includes a stator and a rotor. The power supply module 31 is configured to supply power to the motor 38. The driver circuit 33 is electrically connected to the motor 38 and the power supply module 31, and the driver circuit 33 is configured to apply a voltage of the power supply module 31 to the motor 38.

As shown in FIG. 4, the control module 30 is separately electrically connected to a current detection module 37, a rotor position detection module 36, an actual rotational speed detection module 35, and the driver circuit 33. The current detection module 37 is configured to acquire a current of the motor 38. The rotor position detection module 36 is configured to acquire a rotor position. The actual rotational speed detection module 35 is configured to acquire an actual rotational speed of the motor 38. The control module 30 controls the driver circuit 33 according to a detection value of the current detection module 37, the rotor position of the motor acquired by the rotor position detection module 36, and the rotational speed of the motor 38 acquired by the actual rotational speed detection module 35.

In this type of power tool, the control module 30 is configured to control an operation process of the motor 38. In some examples, the control module 30 is a dedicated controller such as some dedicated control chips (such as a microcontroller unit (MCU)). The control module 30 is integrated with a signal processing unit, where the signal processing unit is configured to process acquired related parameter signals and has functions of calculation, comparison, and determination. After the signal processing unit processes the signals, the signal processing unit can generate control signals and output the control signals to the driver circuit 33, so as to drive the motor 38 to operate.

The power supply module 31 is configured to supply power to a control system of the motor 38, and a power supply circuit 32 is connected to the power supply module 31. The power supply circuit 32 is used for receiving power from the power supply module 31 and converting the power from the power supply module 31 into power used by at least the control module 30.

The driver circuit 33 is electrically connected to the control module 30 and the motor 38, and the driver circuit 33 can drive the motor 38 to operate according to a control signal outputted by the control module 30. As an example, the motor 38 is a three-phase motor with three-phase windings, and specifically, the driver circuit 33 is electrically connected to the three-phase windings of the motor 38. Specifically, the driver circuit 33 includes a switching circuit, where the switching circuit is configured to drive the running of the rotor of the motor 38 according to the control signal of the control module 30.

To make the motor 38 rotate, the driver circuit 33 has multiple driving states. In a driving state, a stator winding of the motor generates a magnetic field, and the control module 30 is configured to output a corresponding drive signal to the driver circuit 33 according to a rotational position of the rotor of the motor 38 to make the driver circuit 33 switch the driving states. In this manner, a state of a voltage and/or a current applied to the windings of the motor 38 varies, and an alternating magnetic field is generated to drive the rotor to rotate so that the motor can be driven.

A rotor position of the motor 38 may be obtained by the rotor position detection module 36. For example, the rotor position detection module 36 includes three Hall sensors disposed along a circumferential direction of the rotor of the motor 38. In the case where the rotor rotates in and out of a preset range, signals of the Hall sensors vary, and an output signal of the rotor position detection module 36 also varies accordingly. In this manner, the position of the rotor of the motor may be known according to a detection signal outputted by the rotor position detection module 36.

Apparently, the rotor position of the motor is estimated, for example, the rotor position detection module 36 that performs calculation using a back electromotive force (EMF) detection method may be built into the control module 30 or disposed outside the control module 30.

The driver circuit 33 includes switching elements VT1, VT2, VT3, VT4, VT5, and VT6. The switching elements VT1, VT2, VT3, VT4, VT5, and VT6 form a three-phase bridge, where VT1, VT3, and VT5 are high-side switches, and VT2, VT4, and VT6 are low-side switches. Field effect transistors, insulated-gate bipolar transistor (IGBT) transistors and the like may be selected as the switching elements VT1 to VT6. Control terminals of the switching elements are electrically connected to the control module 30, respectively. Connection states of the switching elements VT1 to VT6 vary according to drive signals outputted by the control module 30 so that the state of the voltage and/or the current applied to the windings of the motor 38 by the power supply module 31 varies, and the motor 38 is driven to operate.

A target rotational speed input module 34 is used for the user to input a target rotational speed of the motor and is associated with and connected to the operating device 15 on the power tool, where the operating device may be an operating switch or the like for the user to adjust the speed.

The actual rotational speed detection module 35 is associated with and connected to the motor 38 and configured to detect the actual rotational speed of the motor 38. As an optional solution, the actual rotational speed detection module 35 includes a speed detection sensor disposed near or inside the motor 38 to acquire the actual rotational speed of the motor 38. For example, a photoelectric sensor disposed near the motor 38 can acquire the rotational speed of the motor 38. For another example, a Hall sensor disposed near the rotor inside the motor 38 can acquire the actual rotational speed of the motor 38 according to a speed of rotation of the rotor.

However, in some cases, especially in the case where the power tool operates at high speed and/or high temperature, the detection accuracy of the sensor may be affected, and even the detection of the speed detection sensor may fail. To solve this problem, as another example, the actual rotational speed detection module 35 does not include a sensor, and an electrical signal outputted by the motor 38 is estimated so as to obtain the actual rotational speed. For example, the current of the motor 38 is detected so that a zero crossing of a back EMF of the motor 38 is obtained, a periodic variation law of the operation of the motor 38 is obtained, and thus the actual rotational speed of the motor 38 is acquired according to the periodic variation law.

The motor 38 may be an inner rotor motor or an outer rotor motor. In some examples, the motor 38 is an inner rotor brushless motor. Optionally, the motor 38 is an inner rotor permanent magnet synchronous brushless motor. In some examples, the motor 38 is an outer rotor brushless motor. Optionally, the motor 38 is an outer rotor permanent magnet synchronous brushless motor.

The current detection module 37 is associated with and connected to the motor 38 and configured to acquire an operating current of the motor 38, where the current is a phase current of the motor 38. The current detection module 37 transmits the acquired current of the motor 38 to the control module 30. The control module 30 in the present application is configured to determine whether the power tool is in a first operation stage or a second operation stage; in the first operation stage, the control module controls the driver circuit so that a voltage of the motor varies with the rotor position of the motor in a square wave; in the second operation stage, the control module controls the driver circuit so that the voltage of the motor varies with the rotor position of the motor in a sine wave or a saddle wave; an output shaft load of the motor in the first operation stage is less than an output shaft load of the motor in the second operation stage.

The power tool can improve the efficiency of the power tool and effectively improve the performance of the power tool. Further, a better heavy-load performance can be achieved so that the motor has better output characteristics under both light-load and heavy-load cases.

In some examples, whether the power tool is in the first operation stage or the second operation stage is determined according to a load-related parameter. Optionally, the load-related parameter of the motor includes at least one of a current of the motor, the rotational speed of the motor, torque of the motor, or acceleration of the power tool.

Optionally, in the case where the rotational speed of the motor is less than or equal to a first preset rotational speed threshold and a current of the motor is greater than or equal to a first preset current threshold, it is determined that the power tool is in the second operation stage and the control module is switched from a first control mode to a second control mode. Through double determination of the rotational speed and the current, whether the power tool is in the second operation stage can be more accurately determined. The first control mode is a square wave control mode, and the second control mode is a sine wave control mode.

As an example, in this example, the first operation stage is a light-load and medium-load operation stage, and the second operation stage is a heavy-load operation stage of the power tool.

In other examples, the first operation stage is a motor driving stage of the power tool and may be one or more stages of light-load, medium-load or heavy-load operation stages, and the second operation stage is a motor braking stage of the power tool. That is to say, the first control mode is adopted when the motor is normally driven, and the mode is switched to the second control mode during braking.

Optionally, in the case where the rotational speed of the motor is greater than or equal to a second preset rotational speed threshold and the current of the motor is less than or equal to a second preset current threshold, it is determined that the power tool is in the first operation stage and the control module is switched from the second control mode to the first control mode.

The second preset current threshold is less than the first preset current threshold, and the second preset rotational speed threshold is greater than the first preset rotational speed threshold. A hysteresis is configured for a current threshold and/or a rotational speed threshold so that the motor may be prevented from frequently entering and exiting the first control mode or the second control mode and thus prevented from oscillating.

In the first control mode, the control module outputs a first PWM control signal to the driver circuit; in the second control mode, the control module outputs a second PWM control signal to the driver circuit; where a duty cycle of the second PWM control signal varies with the rotor position of the motor.

Figure 6:
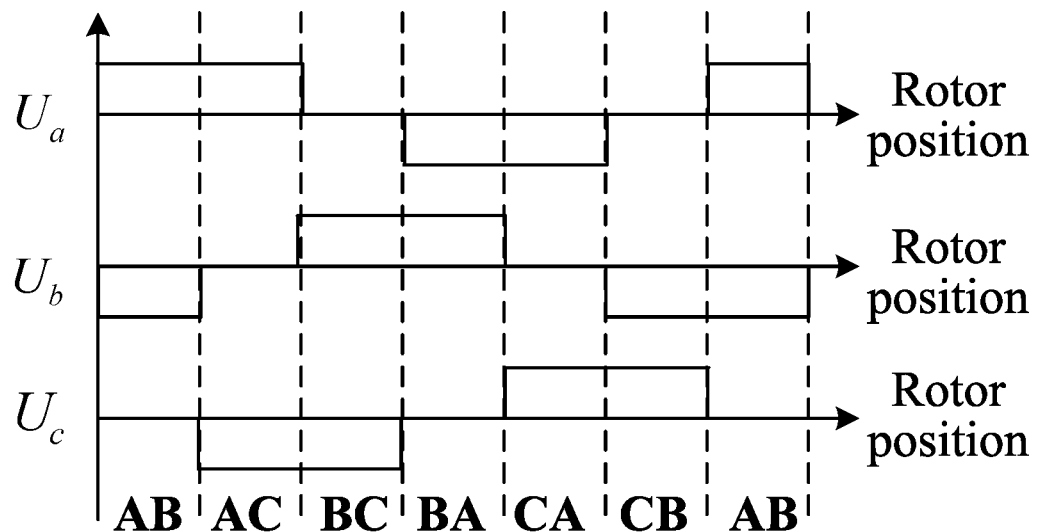
FIG. 6 is a schematic diagram illustrating variation of a voltage of each phase winding with a rotor position in the case where a first control mode is a square wave control mode according to an example.

Specifically, referring to FIG. 6, in the first control mode, the control module 30 controls the driver circuit 33 so that the voltage of the motor 38 varies with the rotor position of the motor in the square wave.

Figure 5:
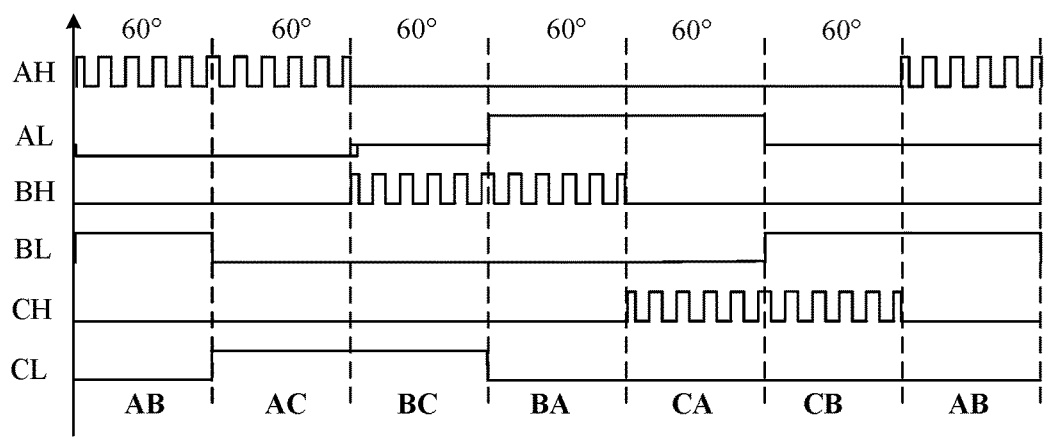
FIG. 5 is a schematic diagram of PWM signals of control terminals of each switch in the case where a first control mode is a square wave control mode according to an example.

Specifically, the high-side switches (VT1, VT3, and VT5) on a current loop adopt the PWM signal to control the speed of the motor. Specifically, during a PWM signal control period of one of the high-side switches, one of the low-side switches remains on, and the high-side switch, the low-side switch and a corresponding winding form a current loop. Referring to FIG. 5, the case where the control module 30 controls the motor 38 so that a driving state of the motor 38 is an AB state is used as an example. The high-side switch VT1 is controlled by the PWM signal. During the PWM control of the high-side switch VT1, the control module 30 outputs a low-level signal to the low-side switch VT4 so that the low-side switch VT4 is turned on, and the high-side switch VT1, the low-side switch VT4 and corresponding first phase winding A and second phase winding B form a current loop. In this manner, during the operation of the brushless motor, every time the rotor rotates by an electrical angle of 60°, the brushless motor commutates once, that is, every time the rotor rotates by an electrical angle of 60°, the driving state of the motor is switched from a previous state to a next state.

Figure 7:
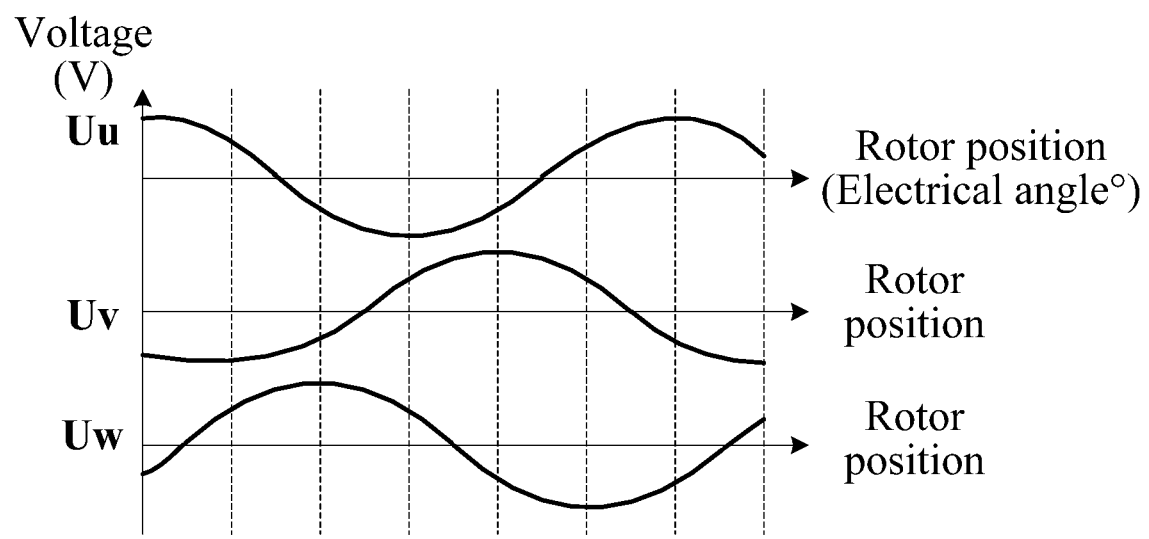
FIG. 7 is a schematic diagram illustrating variation of an input voltage of a motor with a rotor position in the case where a second control mode is a sine wave control mode according to an example.
Figure 8:
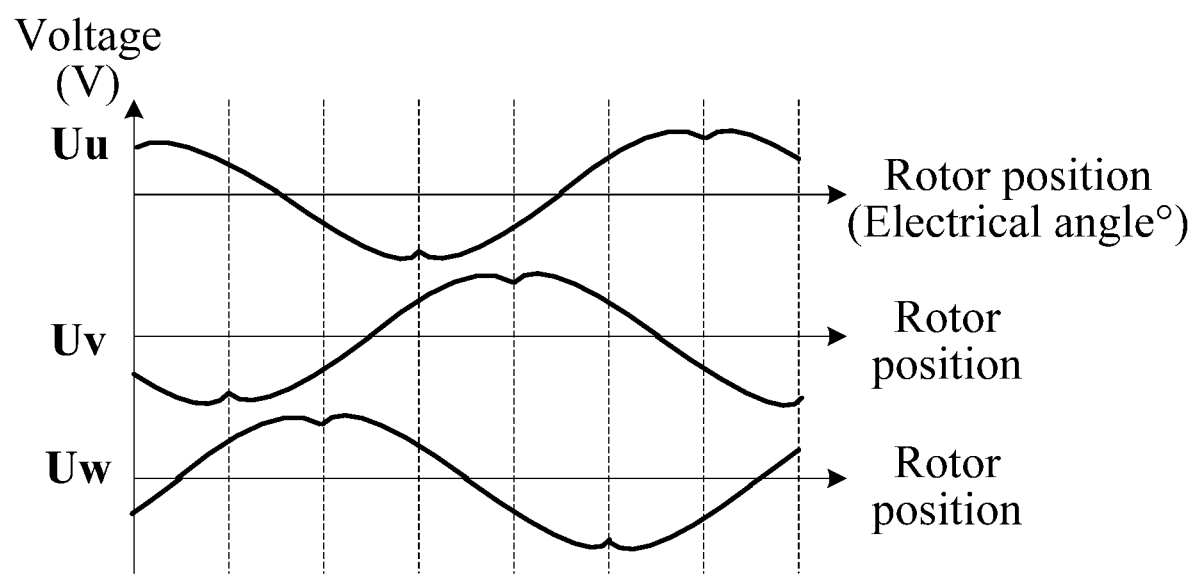
FIG. 8 is a schematic diagram illustrating variation of an input voltage of a motor with a rotor position in the case where a second control mode is a saddle wave control mode according to an example.

In the second control mode, the control module controls the driver circuit so that the voltage of the motor varies with the rotor position of the motor in the sine wave or the saddle wave. Specifically, as shown in FIG. 7, a line voltage of the motor 38 varies in the sine wave; as shown in FIG. 8, a phase voltage of the motor varies in the saddle wave.

Figure 9:
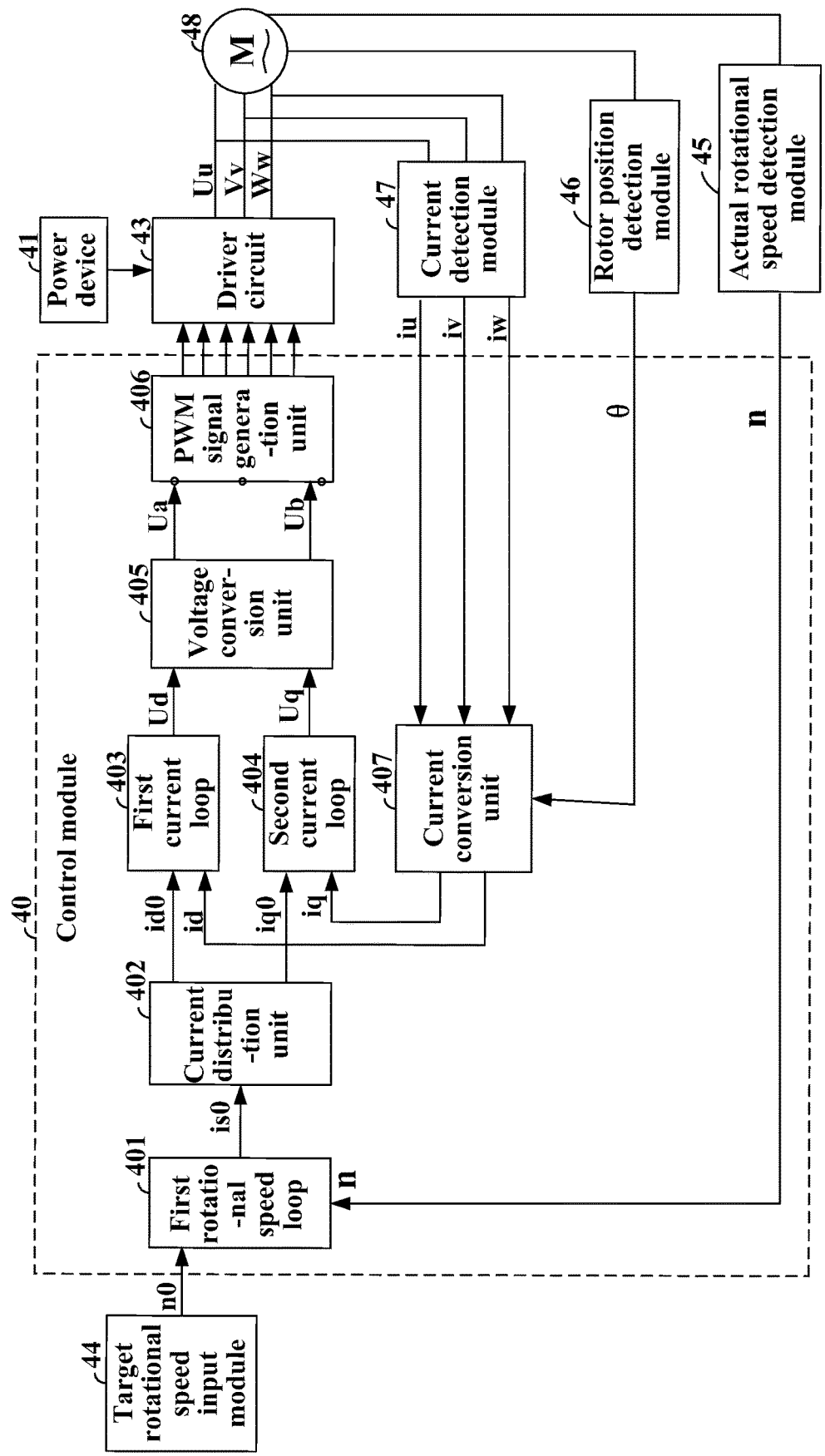
FIG. 9 is a circuitry block diagram of an example in a second control mode.

As an example, a control system in the second control mode is shown in FIG. 9.

The control system includes a control module 40, a power device 41, a driver circuit 43, a target rotational speed input module 44, an actual rotational speed detection module 45, a rotor position detection module 46, a current detection module 47, and a motor 48. Functions, structures, and compositions of the assemblies in this example are the same as or similar to functions, structures, and compositions of the assemblies in the preceding example shown in FIG. 4, which are not repeated herein. A difference is that, more specifically, the control module 40 is adopted in this example and mainly includes a first rotational speed loop 401, a current distribution unit 402, a first current loop 403, a second current loop 404, a voltage conversion unit 405, a current conversion unit 407, and a PWM signal generation unit 406.

The first rotational speed loop 401 is associated with and connected to the target rotational speed input module 44 and the actual rotational speed detection module 45. The first rotational speed loop 401 is configured to acquire a target rotational speed n0 of the motor 48 set by the user from the target rotational speed input module 44 and an actual rotational speed n of the motor 48 detected by the actual rotational speed detection module 45. The target rotational speed input module 44 is associated with and connected to a speed regulation operating device of the power tool.

The first rotational speed loop 401 is configured to generate a target current is0 according to the target rotational speed n0 and the actual rotational speed n of the motor 48. Specifically, the first rotational speed loop 401 can generate the target current is0 through comparison and adjustment according to the target rotational speed n0 and the actual rotational speed n of the motor 48, and the target current is0 is used for making the actual rotational speed n of the motor 48 approach the target rotational speed n0. The first rotational speed loop includes a comparison unit and an adjustment unit (not shown), where the adjustment unit may be a proportional-integral (PI) adjustment unit.

The current distribution unit 402 is connected to the first rotational speed loop 401 and configured to distribute a direct axis target current id0 and a quadrature axis target current iq0 according to the target current is0.

Figure 10:
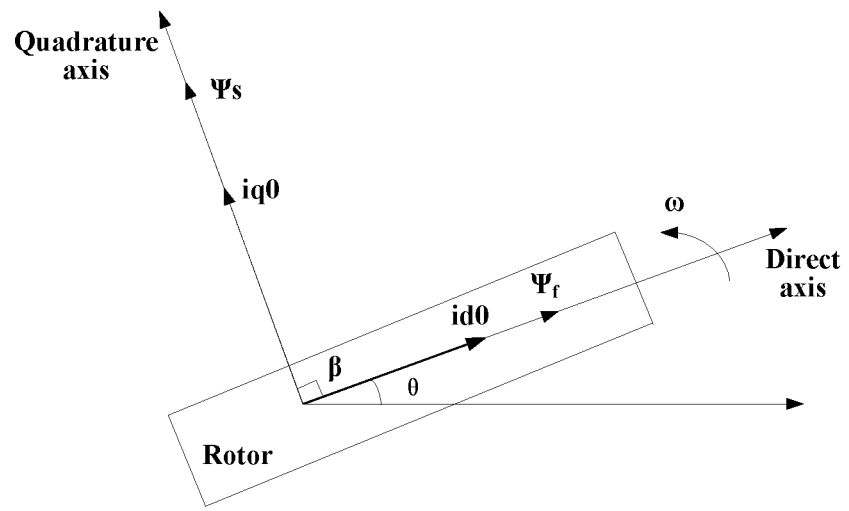
FIG. 10 is a space vector diagram of a stator flux linkage and a rotor flux linkage of a motor, and a current in a direct-quadrature (d-q) coordinate system according to an example.
Figure 11:
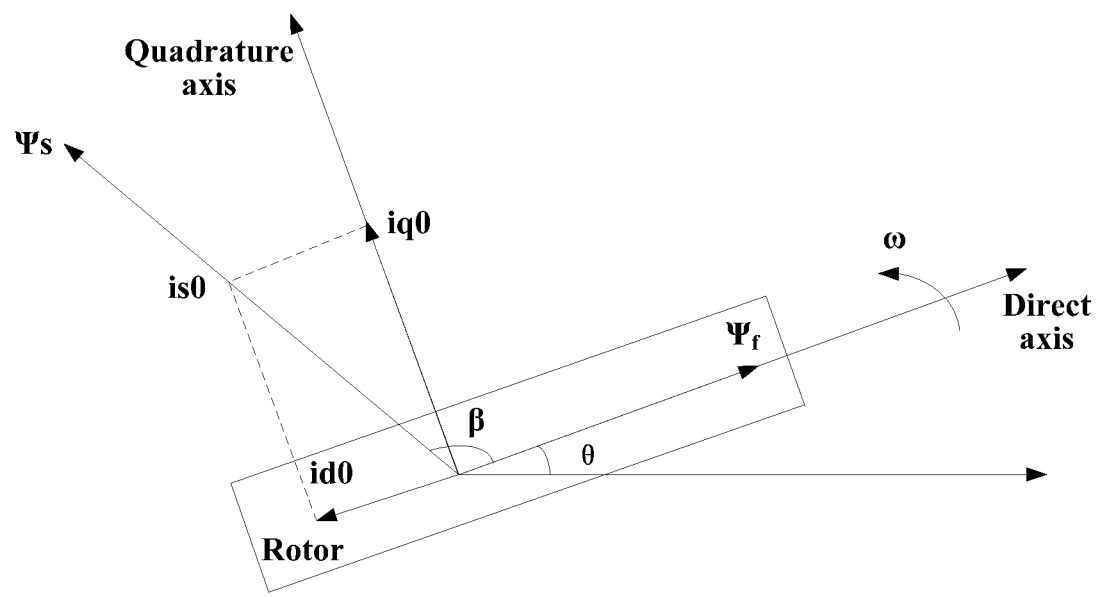
FIG. 11 is a space vector diagram of a stator flux linkage and a rotor flux linkage of a motor, and a current in a d-q coordinate system according to another example.

Referring to FIGS. 10 and 11, a direct axis and a quadrature axis constitute a direct axis-quadrature axis coordinate system. The direct axis-quadrature axis coordinate system is established on the rotor of the motor and rotates synchronously with the rotor. A magnetic field direction of the rotor is the direct axis, the quadrature axis is perpendicular to the magnetic field direction of the rotor, the direct axis target current id0 is in the same direction as the direct axis, and the quadrature axis target current iq0 is in the same direction as the quadrature axis. The quadrature axis target current iq0 is an excitation current and used for controlling torque and generating torque perpendicular to the rotor to drive the rotor to rotate. The quadrature axis target current iq0 is used for controlling the speed of the motor to reach the target rotational speed n0 of the motor 48 as quickly and stably as possible. A principle is to use a torque current to control electromagnetic torque of the motor 48 so that the rotor is driven to rotate to the maximum, thereby improving the efficiency and heavy-load performance of the motor 48. The quadrature axis target current iq0 and the direct axis target current id0 may be obtained by calculation or may be set directly.

In the case where a voltage is applied to the motor 48, the stator can generate a current so that the motor 48 generates electromagnetic torque Te. The electromagnetic torque Te of the motor 48 may be obtained by the formula described below.

$$Te = 1.5 P_n [\Psi_f * iq0 + (Ld - Lq) * id * iq] \quad (1)$$

$\Psi_f$ denotes a rotor flux linkage, iq denotes a quadrature axis current, id denotes a direct axis current, Ld denotes direct axis inductance of the stator winding, Lq denotes quadrature axis inductance of the stator winding, $P_n$ denotes the number of magnetic pole pairs, and $\Psi_f$ denotes a flux-linkage constant of a certain motor.

As an example of the motor, Ld=Lq. Referring to FIG. 10, in this case, Te0=1.5Pn*$\Psi_f$*iq0. To obtain relatively large electromagnetic torque Te, the current distribution unit 402 makes the quadrature axis target current iq0 as large as possible. Since the quadrature axis target current iq0 and the direct axis target current id0 are actually obtained by decoupling the target current is0 of the motor, if the quadrature axis target current iq0 is to be as large as possible, the direct axis target current id0 should be as small as possible. As an example, id0=0 so that an included angle β between a stator flux linkage $\Psi_s$ and the rotor flux linkage $\Psi_f$ is 90° (shown in FIG. 10). In this manner, the quadrature axis target current iq0 is controlled so as to control the torque, and the torque is perpendicular to the rotor to drive the rotor to rotate.

As another example of the motor, Ld<Lq. Referring to FIG. 11, to obtain the electromagnetic torque Te as large as possible, id0<0, where the direct axis target current id0 and the quadrature axis target current iq0 may be obtained according to the formulas described below.

$$id0 = \frac{-\psi_f + \sqrt{\psi_f^2 + 8(L_q - L_d)^2 i_{s0}^2}}{4(L_q - L_d)} \quad (2)$$

$$iq0 = \text{sign}(i_{s0}^2)\sqrt{i_{s0}^2 - id0^2} \quad (3)$$

$\Psi_f$ denotes a flux linkage generated by a permanent magnet in the rotor, and Lq and Ld denote the quadrature axis inductance and direct axis inductance of the stator winding, respectively. is0 denotes the target current is0 generated by the first rotational speed loop 401 according to the target rotational speed n0 and the actual rotational speed n of the motor 48. A stator current space vector is0 and a stator flux linkage space vector $\Psi_s$ are in-phase, and the included angle β is formed between the stator flux linkage $\Psi_s$ and the rotor flux linkage $\Psi_f$.

Figure 12:
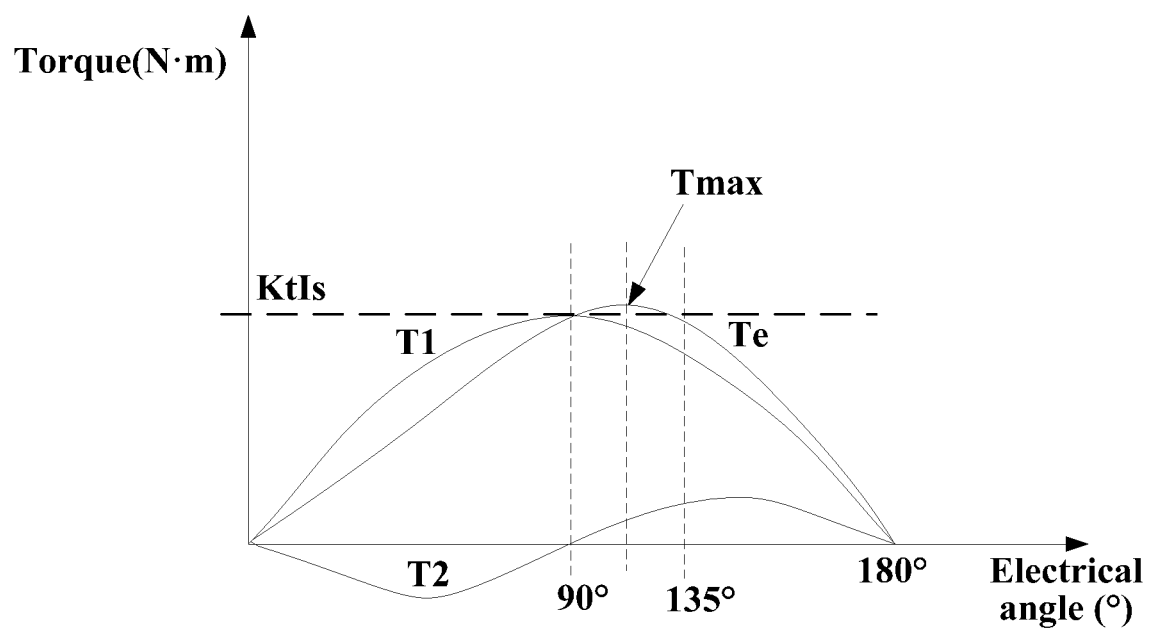
FIG. 12 is a torque-angle characteristic curve of permanent-magnet torque T1, reluctance torque T2, and electromagnetic torque Te of a motor.

The electromagnetic torque Te of the motor 48 is calculated through the following formula: Te=1.5$P_n$[$\Psi_f$*iq+(Ld−Lq)*id*iq], and the formula contains two items, where the former 1.5$P_n\Psi_f$*iq denotes permanent-magnet torque T1 shown by a curve T1 in FIG. 12; the latter 1.5$_n$(Ld−Lq)*id*iq denotes reluctance torque T2 shown by a curve T2 in FIG. 12; and Te is formed by synthesizing the curve T1 and the curve T2. As can be seen from FIG. 12, the synthesized electromagnetic torque Te has an approximate maximum value Tmax or a maximum value Tmax when a corresponding torque angle is in a range of 90° to 135°. Therefore, optionally, the current distribution unit 402 distributes the quadrature axis target current iq0 and the direct axis target current id0 so that the angle β between the stator flux linkage $\Psi_s$ and the rotor flux linkage $\Psi_f$ is in the range of 90° to 135°, and the electromagnetic torque Te as large as possible can be obtained, thereby improving the efficiency and heavy-load performance of the motor under the heavy load.

In summary, the control module 40 can control the current applied to the stator by controlling three-phase voltages Uu, Uv, and Uw applied to the motor 48 according to the rotational speed of the motor, the current of the motor, and the rotor position so that the stator winding generates the stator current space vector is0, the stator current space vector is0 and the stator flux linkage space vector $\Psi_s$ are in-phase, and the stator current space vector is0 is the target current is0. As described above, the target current is0 can be distributed by the current distribution unit 402 as the direct axis target current id0 and the quadrature axis target current iq0, the control module 40 can control the angle β between the stator flux linkage $\Psi_s$ and the rotor flux linkage $\Psi_f$ by separately controlling a quadrature axis current iq and a direct axis current id so that the motor 48 can output the electromagnetic torque Te as large as possible, thereby improving the heavy-load performance and efficiency of the power tool.

The direct axis target current id0 and the quadrature axis target current iq0 distributed by the current distribution unit 402 according to the target current is0 can make the rotor of the motor 48 generate the electromagnetic torque Te as large as possible so that the actual rotational speed of the motor 48 can reach the target rotational speed as soon as possible, thereby improving the heavy-load performance and efficiency of the power tool.

The current conversion unit 407 acquires three-phase currents iu, iv, and iw and performs current conversion such that the three-phase currents iu, iv, and iw are converted into two-phase currents that are a direct axis actual current id and a quadrature axis actual current iq, respectively. The current detection module 47 is configured to transmit the detected three-phase currents iu, iv, and iw in an actual operation of the motor 48 to the current conversion unit 407 in the control module 40. Optionally, the current conversion unit 407 includes Park conversion and Clark conversion.

The first current loop 403 is connected to the current distribution unit 402 and the current conversion unit 407 and acquires the direct axis target current id0 and the direct axis actual current id so as to generate a first voltage adjustment quantity Ud according to the direct axis target current id0 and the direct axis actual current id, where the first voltage adjustment quantity Ud can make the direct axis actual current id approach the direct axis target current id0 as soon as possible. The first current loop 403 includes a comparison unit and an adjustment unit (not shown), where the adjustment unit may be a PI adjustment unit. The first current loop 403 compares the direct axis target current id0 with the direct axis actual current id and performs a PI adjustment according to a comparison result to generate the first voltage adjustment quantity Ud.

The second current loop 404 is connected to the current distribution unit 402 and the current conversion unit 407 and acquires the quadrature axis target current iq0 and the quadrature axis actual current iq to generate a second voltage adjustment quantity Uq according to the quadrature axis target current iq0 and the quadrature axis actual current iq, where the second voltage adjustment quantity Uq is used for making the quadrature axis actual current iq approach the quadrature axis target current iq0. The second current loop 404 includes a comparison unit and an adjustment unit (not shown), where the adjustment unit may be a PI adjustment unit. The second current loop 404 includes comparing the quadrature axis target current iq0 with the quadrature axis actual current iq and performing the PI adjustment according to a comparison result to generate the second voltage adjustment amount Uq.

The first voltage adjustment quantity Ud and the second voltage adjustment quantity Uq further need to be converted into control signals for controlling the driver circuit 43 after some conversions and calculations. The first voltage adjustment quantity Ud and the second voltage adjustment quantity Uq are sent to a control signal generation unit for conversion and calculation. In this example, the control signal generation unit includes the voltage conversion unit 405 and the PWM signal generation unit 406.

The voltage conversion unit 405 is connected to the first current loop 403 and the second current loop 404. The voltage conversion unit 405 acquires the first voltage adjustment quantity Ud, the second voltage adjustment quantity Uq, and the rotor position of the motor 48 from the rotor position detection module 46, converts the first voltage adjustment quantity Ud and the second voltage adjustment quantity Uq into intermediate quantities Ua and Ub related to the three-phase voltages Uu, Uv, and Uw applied to the motor 48, and outputs the intermediate quantities Ua and Ub to the PWM signal generation unit 406. The PWM signal generation unit 406 generates, according to the intermediate quantities Ua and Ub, a PWM signal for controlling the switching elements of the driver circuit 43 so that the power device 41 can output the three-phase voltages Uu, Uv, and Uw to be applied to the windings of the motor 48, where Uu, Uv and Uw are three-phase symmetrical sine-wave voltages or saddle-wave voltages, and a phase difference between any two of the three-phase voltages Uu, Uv, and Uw is 120°. Optionally, the voltage conversion unit 405 includes Park inverse conversion and Clark inverse conversion.

Using the control module 40, this example adopts a control mode described below.

The current conversion unit 407 acquires the three-phase currents iu, iv, and iw detected by the current detection module 47 and rotor position information of the rotor position detection module 46 and performs current conversion such that the three-phase currents iu, iv, and iw are converted into two-phase currents that are the direct axis actual current id and the quadrature axis actual current iq, respectively. The first current loop 403 acquires the direct axis target current id0 and the direct axis actual current id to generate the first voltage adjustment quantity Ud according to the direct axis target current id0 and the direct axis actual current id. The second current loop 404 acquires the quadrature axis target current iq0 and the quadrature axis actual current iq to generate the second voltage adjustment quantity Uq according to the quadrature axis target current iq0 and the quadrature axis actual current iq. The voltage conversion unit 405 acquires the first voltage adjustment quantity Ud, the second voltage adjustment quantity Uq, and the rotor position of the rotor position detection module 46, converts the first voltage adjustment quantity Ud and the second voltage adjustment quantity Uq into the intermediate quantities Ua and Ub related to the three-phase voltages Uu, Uv, and Uw applied to the motor 48, and outputs the intermediate quantities Ua and Ub to the PWM signal generation unit 406. The PWM signal generation unit 406 is configured to, according to the intermediate quantities Ua and Ub, generate the PWM signal for controlling the switching elements of the driver circuit 43 so that the power device 41 can output the three-phase voltages Uu, Uv, and Uw to be applied to the windings of the motor 48. In this example, the three-phase voltages Uu, Uv, and Uw are the three-phase symmetrical sine-wave voltages or saddle-wave voltages, and the phase difference between any two of the three-phase voltages Uu, Uv, and Uw is 120°.

During this process, the control module 40 outputs a control signal that varies with the rotor position, so as to dynamically adjust and control the voltage and/or current applied to the motor, so that the motor 48 can obtain the electromagnetic torque as large as possible at each rotor position, thereby improving the heavy-load performance of the motor and the efficiency of the whole machine.

Figure 13:
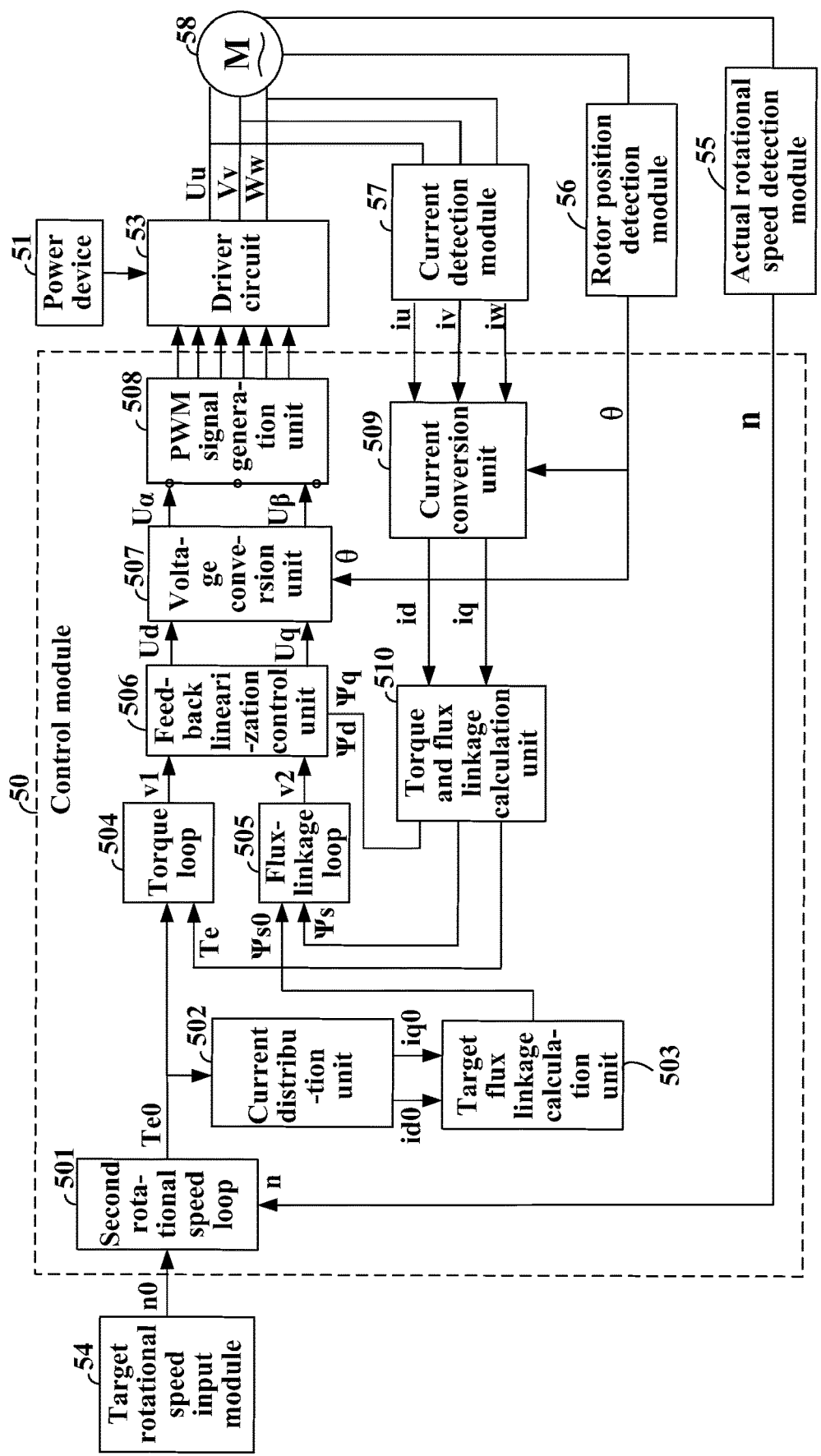
FIG. 13 is a circuitry block diagram of another example in a second control mode.

As another example, a control system in the second control mode is shown in FIG. 13.

The control system includes a control module 50, a power device 51, a driver circuit 53, a target rotational speed input module 54, an actual rotational speed detection module 55, a rotor position detection module 56, a current detection module 57, and a motor 58. Functions, structures, and compositions of the assemblies in this example are the same as or similar to functions, structures, and compositions of the assemblies in the preceding example, which are not repeated herein. A difference is that, more specifically, the control module 50 is adopted in this example and includes a second rotational speed loop 501, a current distribution unit 502, a target flux linkage calculation unit 503, a torque loop 504, a flux linkage loop 505, a feedback linearization control unit 506, a voltage conversion unit 507, a PWM signal generation unit 508, a current conversion unit 509, and a torque and flux linkage calculation unit 510.

The second rotational speed loop 501 is associated with and connected to the target rotational speed input module 54 and the actual rotational speed detection module 55. The second rotational speed loop 501 acquires a target rotational speed n0 of the motor 58 set by the user from the target rotational speed input module 54 and an actual rotational speed n of the motor 58 detected by the actual rotational speed detection module 55.

The second rotational speed loop 501 is configured to generate target torque Te0 according to the target rotational speed n0 and the actual rotational speed n of the motor 58, where the target torque Te0 is electromagnetic torque Te0. Specifically, the second rotational speed loop 501 can generate the target torque Te0 through comparison and adjustment according to the target rotational speed n0 and the actual rotational speed n of the motor 58, where the target torque Te0 is used for making the actual rotational speed n approach the target rotational speed n0 as soon as possible. The second rotational speed loop 501 includes a comparison unit and an adjustment unit (not shown), where the adjustment unit may be a PI adjustment unit.

The current distribution unit 502 distributes the direct axis target current id0 and the quadrature axis target current iq0 according to the outputted target torque Te0.

The direct axis target current id0 and the quadrature axis target current iq0 are vectors with directions and magnitudes, an electrical angle between the direct axis target current id0 and the quadrature axis target current iq0 is 90°, and the direct axis target current id0 and the quadrature axis target current iq0 are located on the direct axis and the quadrature axis, respectively. Optionally, the direct axis target current id0 and the quadrature axis target current iq0 may be obtained according to the formulas described below.

$$iq0 = \sqrt{\frac{\psi_f id0}{L_d - L_q} + id0^2} \quad (4)$$

$$Te0 = 1.5 p_n [\psi_f + (L_d - L_q) id0] \sqrt{\frac{\psi_f id0}{L_d - L_q} + id0^2} \quad (5)$$

$$|\psi_s| = \sqrt{(L_d id0 + \psi_f)^2 + (L_d iq0)^2} \quad (6)$$

$\Psi_f$ denotes the rotor flux linkage, $\Psi_s$ denotes the stator flux linkage, Lq and Ld denote the quadrature axis inductance and direct axis inductance of the stator winding, respectively, and $P_n$ denotes the number of magnetic pole pairs.

The target flux linkage calculation unit 503 can calculate a target stator flux linkage $\Psi_s0$ according to the direct axis target current id0 and the quadrature axis target current iq0. In this manner, a control module 73 can directly perform dynamic adjustment on the stator flux linkage $\Psi_s$ and the electromagnetic torque Te0 so that the rotational speed of the motor reaches or basically reaches the target rotational speed relatively quickly. Apparently, the target stator flux linkage $\Psi_s0$ may also be obtained in other manners, which is not limited to calculation by the target flux linkage calculation unit 503 in this example according to the direct axis target current id0 and the quadrature axis target current iq0.

Figure 14:
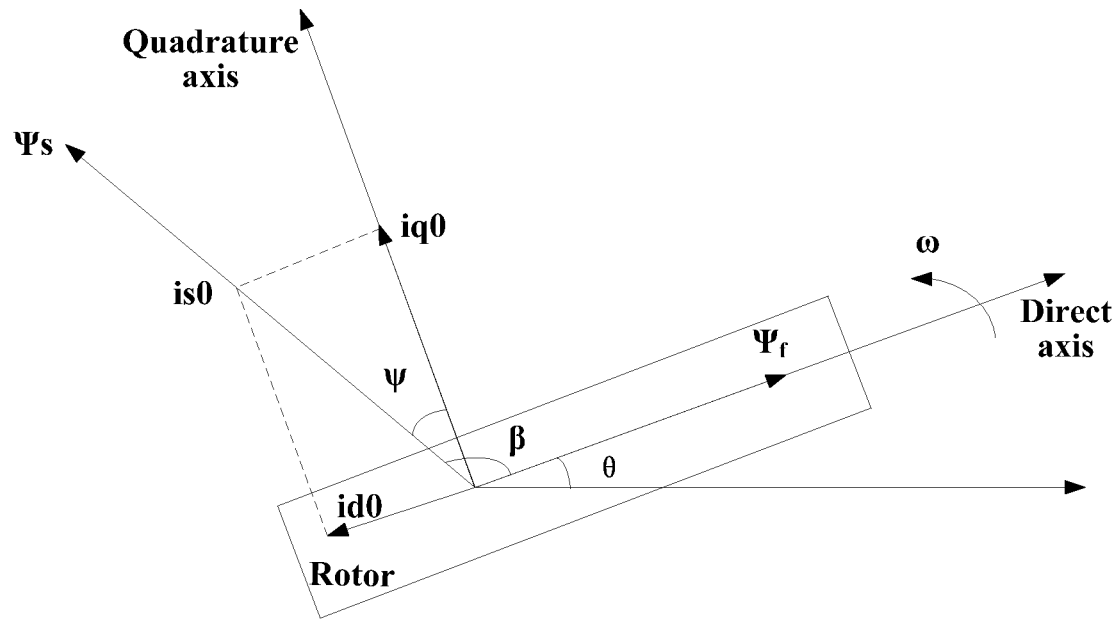
FIG. 14 is a space vector diagram of a stator flux linkage and a rotor flux linkage of a motor, and a current in a d-q coordinate system.

Optionally, the control module 73 controls the angle β between the stator flux linkage $\Psi_s$ and the rotor flux linkage $\Psi_f$ to be 90°; optionally, the control module 73 controls the angle β between the stator flux linkage $\Psi_s$ and the rotor flux linkage $\Psi_f$ between 90° and 135° (referring to FIG. 14). In this manner, the motor 58 can obtain relatively large electromagnetic torque Te, thereby improving the heavy-load performance and efficiency of the power tool.

The target stator flux linkage $\Psi_s0$ and the target torque Te0 are compared and adjusted with an actual stator flux linkage $\Psi_s$ and actual torque Te, and a control signal is generated to adjust the actual stator flux linkage $\Psi_s$ and the actual torque Te so as to make the actual stator flux linkage $\Psi_s$ and the actual torque Te reach the target stator flux linkage $\Psi_s0$ and the target torque Te0 as soon as possible.

Specifically, the current conversion unit 509 acquires the three-phase currents iu, iv, and iw detected by the current detection module 57 and a rotor position θ outputted by the rotor position detection module 56 and converts the three-phase currents iu, iv, and iw into two-phase actual currents that are the direct axis actual current id and the quadrature axis actual current iq, respectively, where the direct axis actual current id and the quadrature axis actual current iq are vectors with directions and magnitudes, and a direction of the direct axis actual current id and a direction of the quadrature axis actual current iq are perpendicular to each other.

The torque and flux linkage calculation unit 510 acquires the direct axis actual current id and the quadrature axis actual current iq from the current conversion unit 509 and generates the actual torque Te and the actual stator flux linkage $\Psi_s$ according to the direct axis actual current id and the quadrature axis actual current iq. The actual torque Te is outputted to the torque loop 504 and the actual stator flux linkage $\Psi_s$ is outputted to the flux linkage loop 505. In other examples, the actual torque Te and the actual stator flux linkage $\Psi_s$ may also be obtained by direct detection.

The torque loop 504 acquires the actual torque Te calculated by the torque and flux linkage calculation unit 510 and the target torque Te0 outputted by the second rotational speed loop 501 and generates a first adjustment quantity v1 according to the actual torque Te and the target torque Te0. The first adjustment quantity v1 is used for compensating the actual torque Te so that the actual torque Te approaches the target torque Te0. The torque loop 504 includes a comparison unit and an adjustment unit. Optionally, the adjustment unit may be a PI adjustment unit. The torque loop 504 compares the actual torque Te with the target torque Te0 and performs the PI adjustment to obtain the first adjustment quantity v1.

The flux linkage loop 505 acquires the actual stator flux linkage $\Psi_s$ calculated by the torque and flux linkage calculation unit and the target stator flux linkage $\Psi_s0$ generated by the target flux linkage calculation unit 503 and generates a second adjustment quantity v2 according to the actual stator flux linkage $\Psi_s$ and the target stator flux linkage $\Psi_s0$. The second adjustment quantity v2 is used for compensating the actual stator flux linkage $\Psi_s$ so that the actual stator flux linkage $\Psi_s$ approaches the target stator flux linkage $\Psi_s0$. The flux linkage loop 505 includes a comparison unit and an adjustment unit. Optionally, the adjustment unit may be a PI adjustment unit. The flux linkage loop 505 compares the actual stator flux linkage $\Psi_s$ with the target stator flux linkage $\Psi_s0$ and performs the PI adjustment to obtain the second adjustment quantity v2.

After some conversions and calculations, the first adjustment quantity v1 and the second adjustment quantity v2 need to be converted into control signals for controlling the driver circuit 53. The first adjustment quantity v1 and the second adjustment quantity v2 are inputted to the control signal generation unit. In this example, optionally, the control signal generation unit includes the feedback linearization control unit 506, the voltage conversion unit 507, and the PWM signal generation unit 508.

The feedback linearization control unit 506 generates a voltage control quantity Uq and a voltage control quantity Ud in a direct axis-quadrature axis coordinate system according to the first adjustment quantity v1 generated by the torque loop 504, the second adjustment quantity v2 generated by the flux linkage loop 505, and a direct axis component $\Psi_d$ and a quadrature axis component $T_q$ of the actual stator flux linkage $\Psi_s$ generated by the torque and flux linkage calculation unit 510.

The voltage conversion unit 507 acquires the voltage control quantity Uq and the voltage control quantity Ud and converts the voltage control quantity Uq and the voltage control quantity Ud into a voltage control quantity Ua and a voltage control quantity UP in an α-β coordinate system.

The PWM signal generation unit 508 generates a PWM control signal for controlling the driver circuit 53 according to the voltage control quantity Ua and the voltage control quantity UP in the α-β coordinate system so that the power device 51 outputs the three-phase voltages Uu, Uv, and Uw to be applied to the windings of the motor 58. In this example, Uu, Uv, and Uw are the three-phase symmetrical sine-wave voltages or saddle-wave voltages, and the phase difference between any two of Uu, Uv, and Uw is 120°. Optionally, the three-phase voltages Uu, Uv, and Uw applied to the motor 58 make an angle between the stator flux linkage $\Psi_s0$ and the rotor flux linkage $\Psi_f$ be 90°. Optionally, the three-phase voltages Uu, Uv, and Uw applied to the motor 58 make the angle between the stator flux linkage $\Psi_s0$ and the rotor flux linkage $\Psi_f$ in a range of 90° to 135°.

In this manner, torque control is performed directly according to the electromagnetic torque Te and the stator flux linkage $\Psi_s$ fed back actually so that the motor obtains a relatively fast torque response speed, thereby improving the heavy-load performance of the motor and the efficiency of the whole machine. In this example, an appropriate voltage vector for control is selected according to the error obtained by comparing the given target torque with the actual torque and the error obtained by comparing the given target stator flux linkage with the actual stator flux linkage, and a control effect of this example is determined by the actual torque. Therefore, a relatively fast torque response can be obtained, the heavy-load performance is better, and the efficiency is relatively high.

The power tool in the present application performs a switching process before switching from the first control mode to the second control mode. Optionally, in the switching process, output of the first PWM control signal to the driver circuit is suspended so that the motor stops driving and coasts to a stop.

Optionally, the switching process starts to be performed at a preset position of the rotor. After it is determined that a switching condition of the second control mode is satisfied, the switching process starts to be performed when the rotor reaches the preset position so that the rotor position at an initial stage of switching to the second control mode can be easily acquired according to a preset duration below after the motor coasts to a stop. The preset position is a commutation position (one of six commutation positions in the square wave control mode).

As an example, the rotational speed of the motor before the switching process is equal to or basically equal to the rotational speed of the motor after the switching process. That is to say, variation of the rotational speed of the motor before and after the switching is less than a preset threshold so that the motor does not vary greatly before and after the switching, the feel is not affected, and smooth switching without changing the feel of the user during the switching may be achieved.

In the switching process, an initial duty cycle of the second PWM control signal after the switching is acquired according to the preset duration, the rotational speed of the motor, the rotor position of the motor, and a bus current or bus voltage of the motor. The preset duration is a duration during which the control module performs the switching process.

Specifically, after it is determined that the switching condition of the second control mode is satisfied, when the rotor reaches the preset position and the switching process starts to be performed, that is, the output of the first PWM control signal to the driver circuit is first suspended so that the motor stops driving and coasts to a stop, then the control module calculates the rotational speed and the rotor position of the motor after the preset duration when the motor coasts to a stop according to the preset duration, the rotational speed of the motor before the switching (the rotational speed before the motor stops driving), and the preset position of the rotor. Apparently, a real-time position of the rotor position after the preset duration may also be directly obtained through a sensor, where the calculated rotational speed after the preset duration when the motor coasts to a stop is used as the actual rotational speed n detected by the actual rotational speed detection module in the second control mode, the calculated rotor position is used as a rotor position θ detected by the rotor position detection module in the second control mode, and a rotational speed corresponding to the rotational speed of the motor before the switching process is used as the target rotational speed n0 inputted by the target rotational speed input module. According to the current bus current or bus voltage of the motor, three-phase currents of the motor are calculated and used as the three-phase currents iu, iv and iw of the motor detected by the current detection module. Then, according to the example of FIG. 9 or 13, the initial duty cycle of the second PWM signal is obtained in the PWM signal generation unit, and the PWM signal generation unit may obtain a duty cycle of the second PWM signal by using a space vector pulse width modulation (SVPWM) algorithm, where the rotational speed of the motor corresponding to the initial duty cycle of the second PWM signal after the switching process is equal to or basically equal to the rotational speed of the motor corresponding to a duty cycle of the first PWM signal before the switching. The time of the switching process is relatively short, and the time for the motor to rotate freely is also very short. Before and after the switching, the rotational speed of the motor does not vary greatly, thereby achieving the smooth switching.

Figure 15:
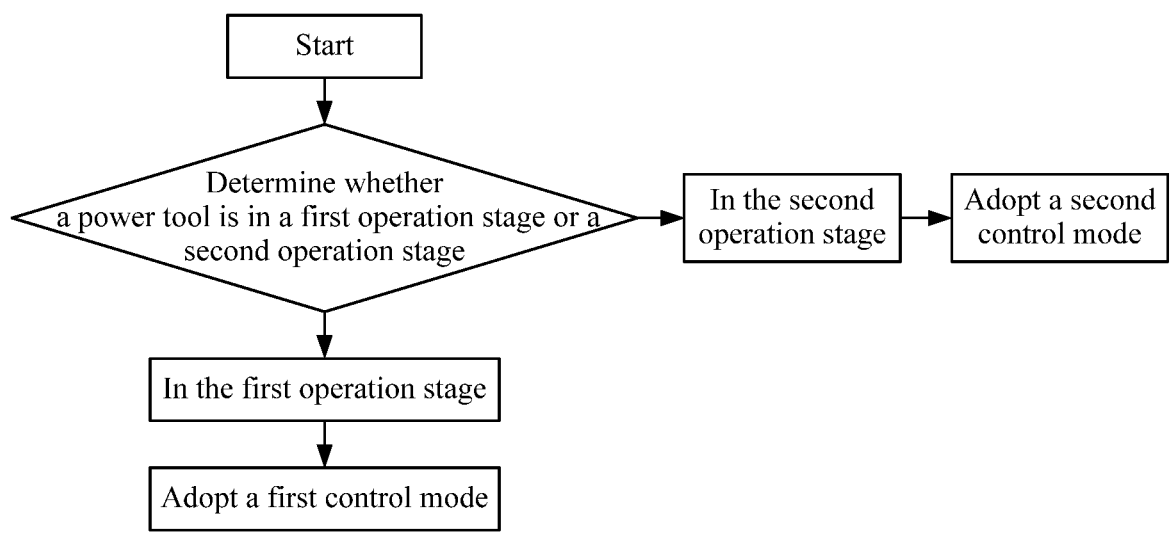
FIG. 15 is an explanatory flowchart of a control method of a power tool according to an example.

An example further provides a control method of a power tool, where the power tool includes a motor, a driver circuit configured to drive the motor, and a control module configured to control the driver circuit, and as shown in FIG. 15, the control method of a power tool includes steps described below.

Whether the power tool is in a first operation stage or a second operation stage is determined; in the case where the power tool is in the first operation stage, the driver circuit is controlled in a first control mode so that an input voltage of the motor varies with a rotor position of the motor in a square wave; and in the case where the power tool is in the second operation stage, the driver circuit is controlled in a second control mode so that the input voltage of the motor varies with the rotor position of the motor in a sine wave or a saddle wave.

The control method of a power tool can improve the overall efficiency, effectively improve the performance of the power tool, and further achieve a better heavy-load performance so that the motor has better output characteristics under both light-load and heavy-load cases.

Figure 16:
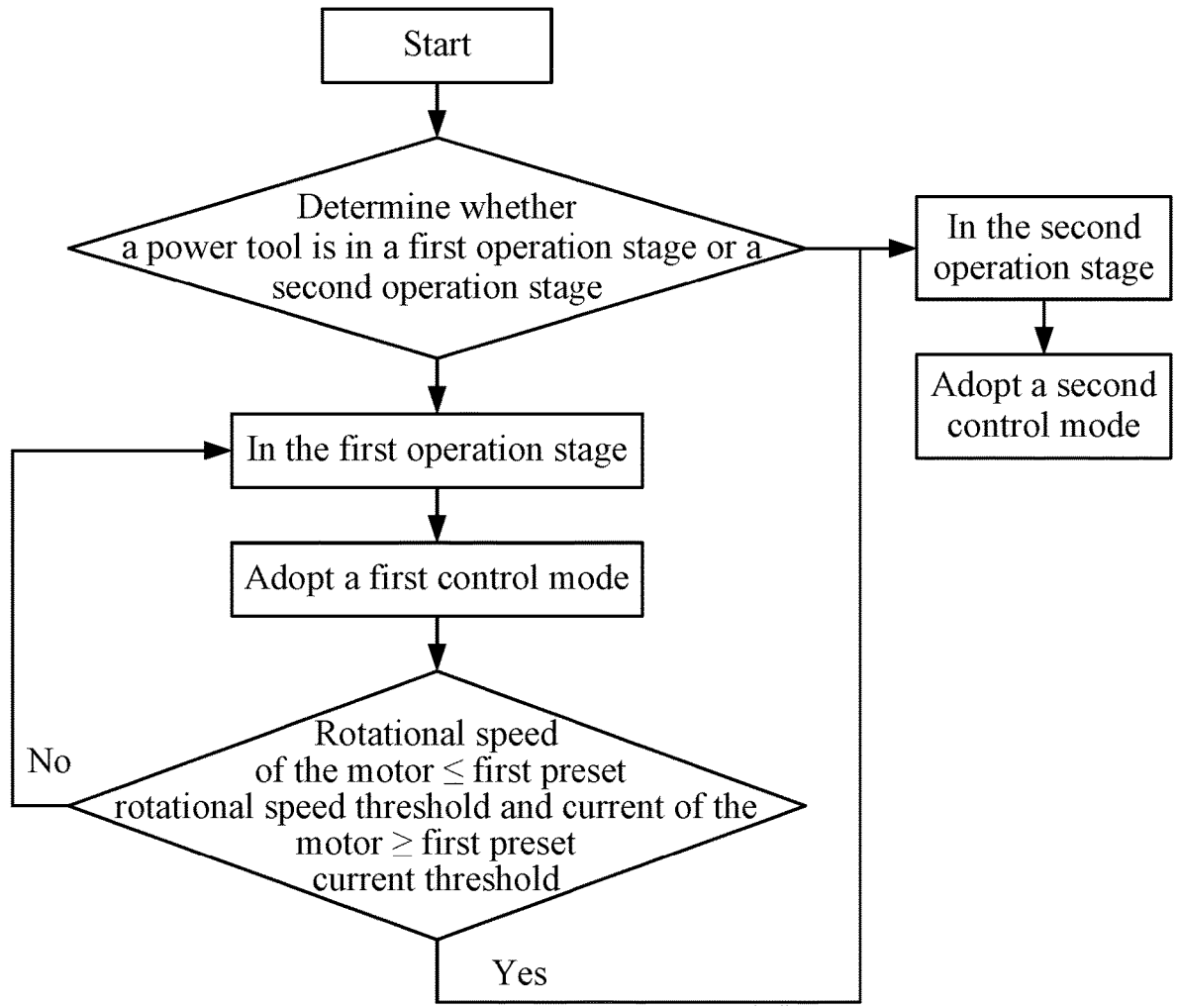
FIG. 16 is an explanatory flowchart of an implementation of a control method of a power tool according to an example.
Figure 18:
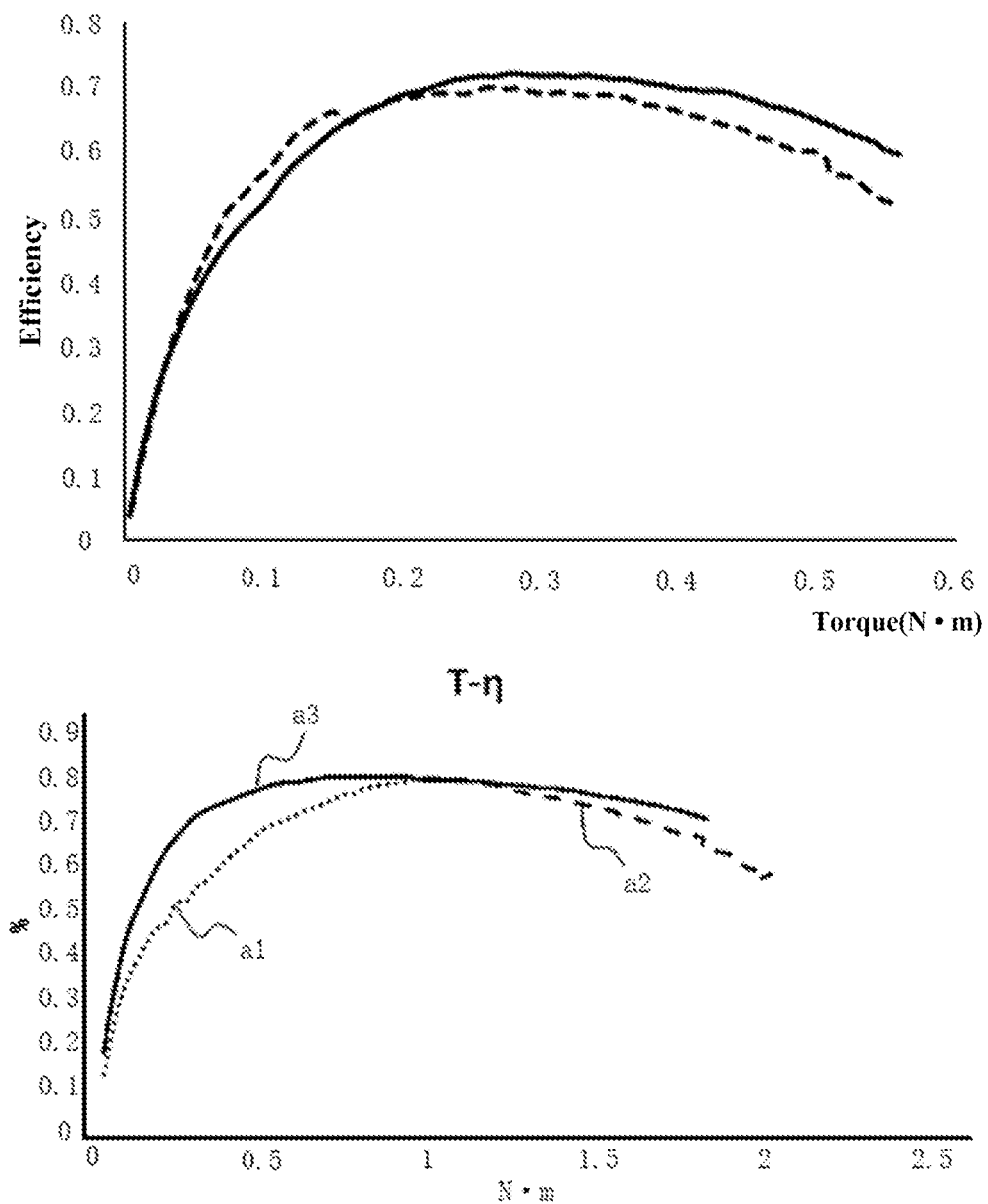
FIG. 18 is an efficiency-torque schematic diagram in the case where a power tool separately adopts a square wave control mode, a sine wave control mode, and a control mode in the present application.

In an example, whether the power tool is in the first operation stage or the second operation stage is determined according to a load-related parameter. Optionally, the load-related parameter of the motor includes at least one of a current of the motor, a rotational speed of the motor, torque of the motor, or acceleration of the power tool. As shown in FIG. 16, in the case where the rotational speed of the motor is less than or equal to a first preset rotational speed threshold and a current of the motor is greater than or equal to a first preset current threshold, it is determined that the power tool is in the second operation stage and the control module is switched from the first control mode to the second control mode. As shown in FIG. 18, a curve a1 is a torque-efficiency curve in a sine wave control mode, a curve a2 is a torque-efficiency curve in a square wave control mode, and a curve a3 is a torque-efficiency curve in a control mode in the present application. It can be seen from FIG. 18 that, with the solution of the present application, the efficiency of the power tool is relatively high whether the power tool is in a light-load case, a medium-load case or a heavy-load case.

Figure 17:
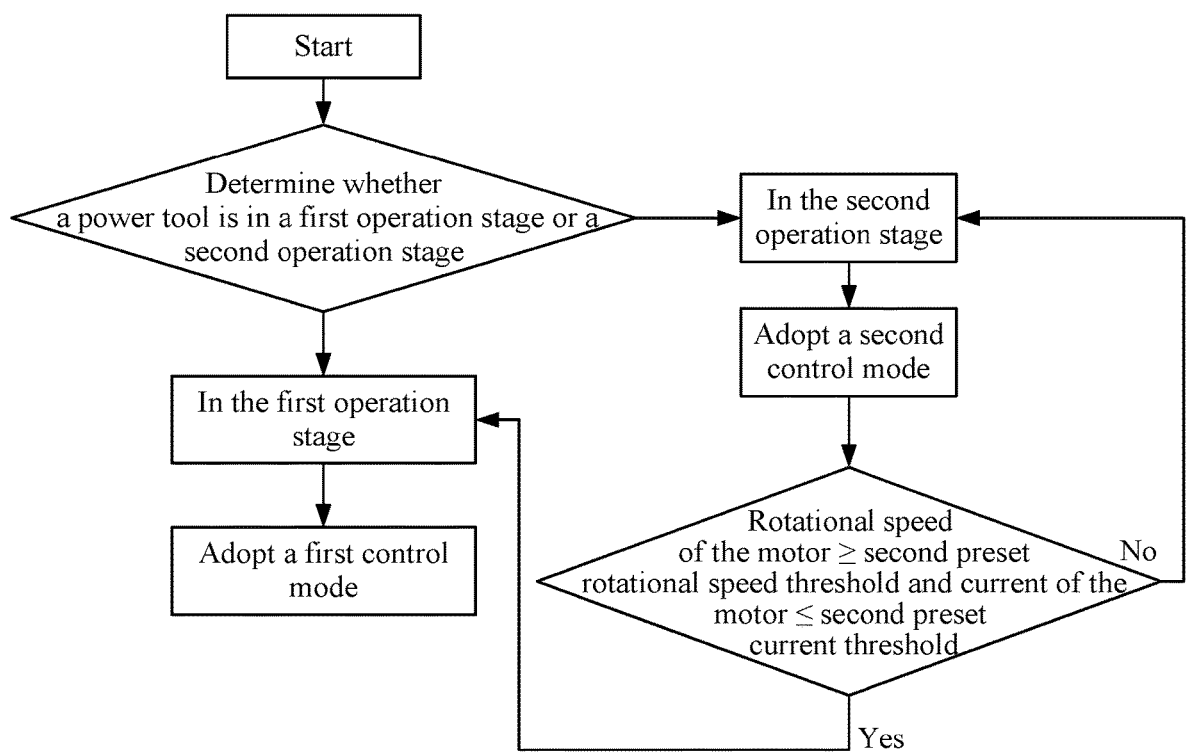
FIG. 17 is an explanatory flowchart of another implementation of a control method of a power tool according to an example.

Optionally, as shown in FIG. 17, in the case where the rotational speed of the motor is greater than or equal to a second preset rotational speed threshold and the current of the motor is less than or equal to a second preset current threshold, it is determined that the power tool is in the first operation stage and the control module is switched from the second control mode to the first control mode.

The second preset current threshold is less than the first preset current threshold, and the second preset rotational speed threshold is greater than the first preset rotational speed threshold. A hysteresis is configured for a current threshold and/or a rotational speed threshold so that the motor may be prevented from frequently entering and exiting the first control mode or the second control mode and thus prevented from oscillating.

As an example, in the first control mode, a first PWM control signal is outputted to the driver circuit; in the second control mode, a second PWM control signal is outputted to the driver circuit; where a duty cycle of the second PWM control signal varies with the rotor position of the motor. The first control mode is the sine wave control mode, and a line voltage varies with the rotor position in a sine wave. A switching process is performed before switching from the first control mode to the second control mode; in the switching process, output of the first PWM control signal to the driver circuit is suspended so that the motor stops driving and coasts to a stop.

Optionally, the switching process starts to be performed at a preset position of the rotor. After it is determined that a switching condition of the second control mode is satisfied, the switching process starts to be performed when the rotor reaches the preset position so that the rotor position at an initial stage of switching to the second control mode can be easily acquired according to a preset duration below after the motor coasts to a stop. The preset position is a commutation position (one of six commutation positions in the square wave control mode).

As an example, in the case where the driver circuit is controlled by the second PWM control signal with an initial duty cycle, a rotational speed of the motor is equal to or basically equal to the rotational speed of the motor before the switching process. That is to say, variation of the rotational speed of the motor before and after the switching is less than a preset threshold so that the motor does not vary greatly before and after the switching, the feel is not affected, and smooth switching without changing the feel of the user during the switching may be achieved.

In the switching process, the initial duty cycle of the second PWM control signal after the switching is acquired according to the preset duration, the rotational speed of the motor, the rotor position of the motor, and a bus current or bus voltage of the motor. Here, the corresponding initial duty cycle of the second PWM control signal after the switching is calculated or pre-stored so that the rotational speed of the motor does not vary greatly before and after the switching, and the smooth switching is achieved. The preset duration is a duration during which the control module performs the switching process.

The motor of the power tool in the example is a brushless motor and may be an alternating current (AC) power tool (high voltage brushless) or a direct current (DC) power tool (DC brushless), and the motor may detect the rotor position by using a sensor (a position sensor) or may estimate the rotor position without using a sensor (a position sensor).

The power tool in the example may be a hand-held power tool, a table tool, a garden tool and the like, which is not limited herein. The power tool in the example includes, but is not limited to, a power tool that requires speed regulation, such as a screwdriver, an electric drill, a wrench, and an angle grinder; a power tool such as a sander, which may be configured to grind workpieces; a reciprocating saw, a circular saw, a jig saw and the like, which may be configured to cut workpieces; and an electric hammer and other power tools which may be configured to make an impact. These tools may also be garden tools, such as pruning machines and chainsaws, and these tools may also be used for other purposes, such as blenders. As long as these power tools can adopt the essence of the technical solutions disclosed above, these power tools are within the protection scope of the present application.

An example further provides a method for switching motor control modes, where the control modes include a first control mode and a second control mode.

In the first control mode, a first PWM control signal is outputted to drive a motor so that an input voltage of the motor varies with a rotor position of the motor in a square wave.

In the second control mode, a second PWM control signal is outputted to drive the motor so that the input voltage of the motor varies with the rotor position of the motor in a sine wave or a saddle wave.

The method for switching motor control modes includes whether the rotor is at a preset position is determined; in the case where it is determined that the rotor is at the preset position, the control modes are switched; the motor is stopped to be driven; a bus voltage or bus current of the motor and a rotational speed of the motor before switching are acquired; a rotational speed of the motor and a rotor position after a preset duration are calculated according to the preset duration, the rotational speed of the motor before the switching, and the preset position of the rotor; and an initial duty cycle of the second PWM control signal after the switching is obtained through calculating or looking up a table according to the calculated rotational speed of the motor and the rotor position after the preset duration and the bus voltage or bus current of the motor.

The method for switching motor control modes can improve the overall efficiency of the motor and effectively improve the performance of the motor.

As an example, whether a power tool is in a first operation stage or a second operation stage is determined according to a load-related parameter of the motor; in the case where the power tool is in the first operation stage, the motor is controlled and driven in the first control mode; and in the case where the power tool is in the second operation stage, the motor is controlled and driven in the second control mode. Optionally, the load-related parameter of the motor includes at least one of a current of the motor, the rotational speed of the motor, torque of the motor, or acceleration of the power tool.

In the case where the rotational speed of the motor is less than or equal to a first preset rotational speed threshold and a current of the motor is greater than or equal to a first preset current threshold, it is determined that the power tool is in the second operation stage and a control module is switched from the first control mode to the second control mode.

Optionally, in the case where the rotational speed of the motor is greater than or equal to a second preset rotational speed threshold and the current of the motor is less than or equal to a second preset current threshold, it is determined that the power tool is in the first operation stage and the control module is switched from the second control mode to the first control mode.

The second preset current threshold is less than the first preset current threshold, and the second preset rotational speed threshold is greater than the first preset rotational speed threshold. A hysteresis is configured for a current threshold and/or a rotational speed threshold so that the motor may be prevented from frequently entering and exiting the first control mode or the second control mode and thus prevented from oscillating.

As an example, a duty cycle of the second PWM signal varies with the rotor position of the motor. The first control mode is a sine wave control mode, and a line voltage varies with the rotor position in the sine wave. A switching process is performed before switching from the first control mode to the second control mode; in the switching process, output of the first PWM control signal to the driver circuit is suspended so that the motor stops driving and coasts to a stop.

Optionally, the switching process starts to be performed at the preset position of the rotor. After it is determined that a switching condition of the second control mode is satisfied, the switching process starts to be performed when the rotor reaches the preset position so that the rotor position at an initial stage of switching to the second control mode can be easily acquired according to a preset duration below after the motor coasts to a stop. The preset position is a commutation position (one of six commutation positions in the square wave control mode).

Figure 19:
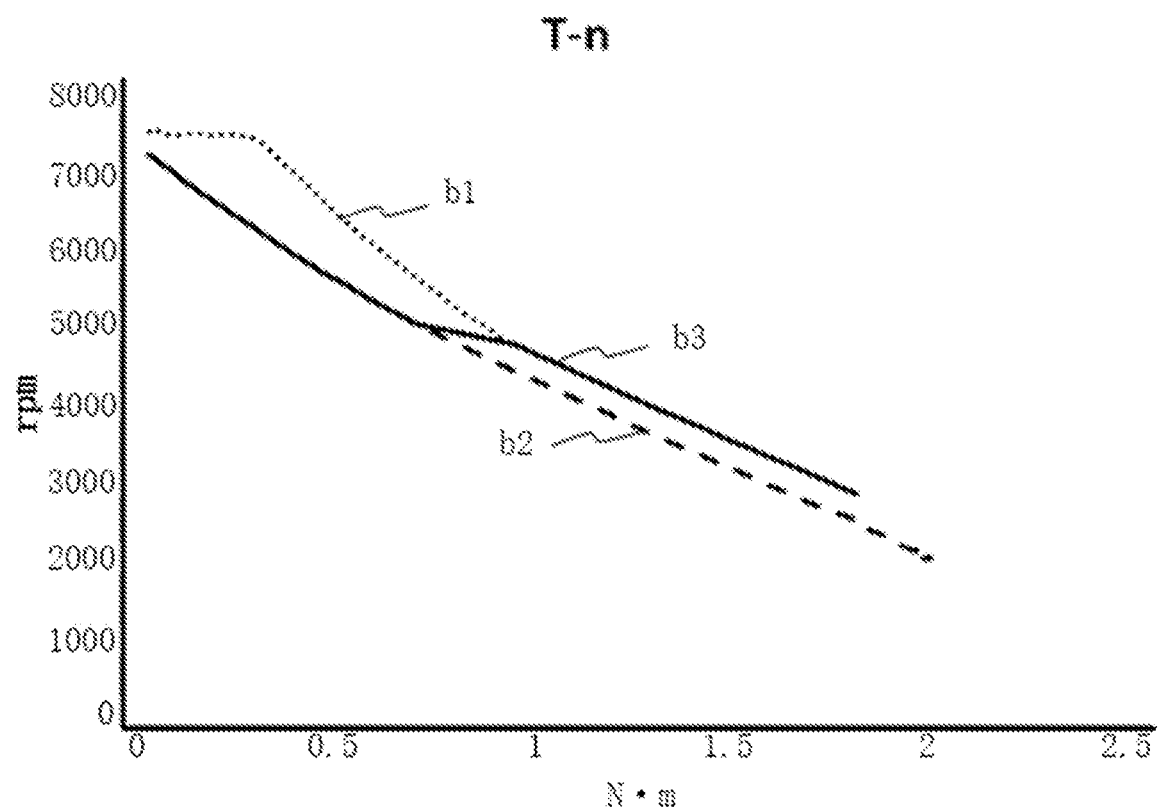
FIG. 19 is a torque-rotational speed schematic diagram in the case where a power tool separately adopts a square wave control mode, a sine wave control mode, and a control mode in the present application.
Figure 20:
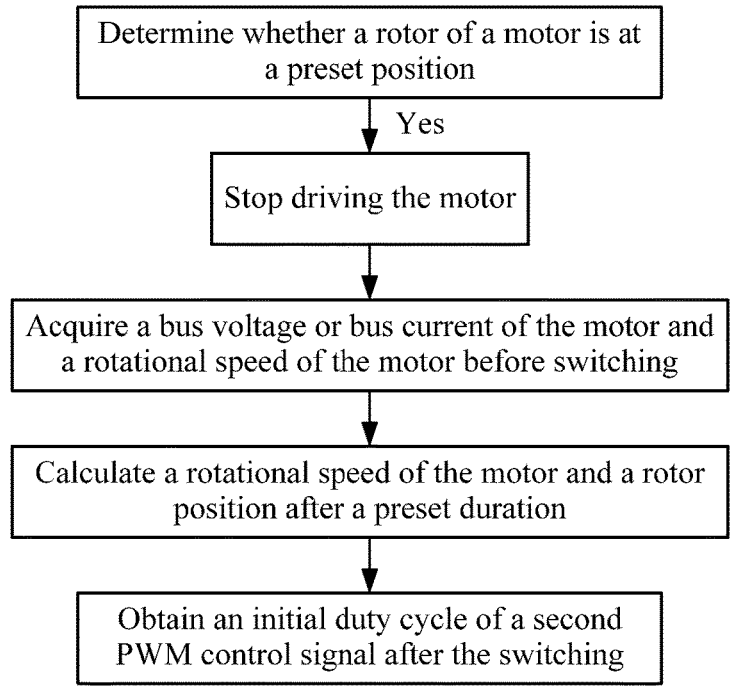
FIG. 20 is an explanatory flowchart of a method for switching motor control modes according to an example.

As an example, in the case where the driver circuit is controlled by the second PWM control signal with an initial duty cycle, a rotational speed of the motor is equal to or basically equal to the rotational speed of the motor before the switching process. That is to say, variation of the rotational speed of the motor before and after the switching is less than a preset threshold so that the motor does not vary greatly before and after the switching, the feel is not affected, and smooth switching without changing the feel of the user during the switching may be achieved. After the variation of the rotational speed of the motor before and after the switching is less than the preset threshold, a sudden change of speed is reduced, so as to basically eliminate a relatively large fluctuation of the speed during the switching, thereby basically achieving the smooth switching. Referring to FIG. 19, a curve b1 is a torque-rotational speed curve in the sine wave control mode, a curve b2 is a torque-rotational speed curve in the square wave control mode, and a curve b3 is a torque-rotational speed curve diagram in a control mode in the present application. It can be seen from FIG. 19 that the method for switching from the square wave to the sine wave in the present application has relatively small fluctuations of speed before and after the switching, achieves the smooth switching, and has a better user experience.

In the switching process, the initial duty cycle of the second PWM control signal after the switching is acquired according to the preset duration, the rotational speed of the motor, the rotor position of the motor, and a bus current or bus voltage of the motor. Here, the corresponding initial duty cycle of the second PWM control signal after the switching is calculated or pre-stored through a field-oriented control (FOC) method or a direct torque control (DTC) method so that the rotational speed of the motor does not vary greatly before and after the switching, and the smooth switching is achieved. The preset duration is a duration during which the control module performs the switching process. Based on this, the rotational speed and the rotor position after the preset duration when the motor coasts to a stop are calculated.

The motor in the example is a brushless motor, and the motor may detect the rotor position by using a sensor (a position sensor) or may estimate the rotor position without using a sensor (a position sensor).

Figure 21:
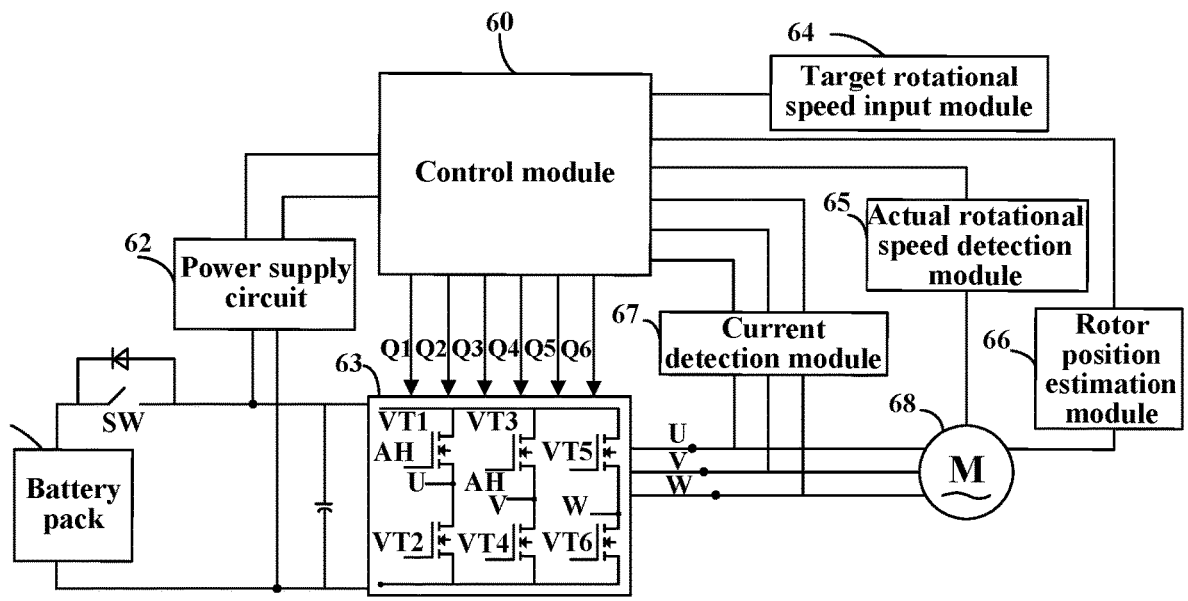
FIG. 21 is a circuitry block diagram illustrating that a first control mode is applied to a driving stage and a second control mode is used for braking.

As an example, the first control mode is applied to a motor driving process, and the second control mode is applied to a motor braking process. The power tool is powered by a battery pack and provided with a diode configured to allow the current of the motor to flow to the battery pack to achieve energy recovery as shown in FIG. 21. In FIG. 21, a control module 60 is separately electrically connected to a current detection module 67, a rotor position detection module 63, an actual rotational speed detection module 65, a driver circuit 63, a power supply circuit 62, and a target rotational speed input module 64. Functions, structures, and compositions of the assemblies in this example are the same as or similar to functions, structures, and compositions of the assemblies in the preceding example shown in FIG. 4, which are not repeated herein. A different is described below.

When the control module 60 controls the power tool to enter a shutdown or deceleration state, a drive signal is generated so as to drive the motor 68 to operate and output a sinusoidal current that flows to a battery pack 61. Such an effect may be specifically controlled by setting a given torque current value iq* vector to a negative direction, and at this case, a given excitation current value id* may also be set to 0. In this manner, the torque of the motor is counteracted in an algorithm, thereby reducing a driving capability of the motor and effectively reducing an operating speed of the motor. At the same time, as a switch triggered by a shutdown or deceleration command, SW in FIG. 21 may also be placed in a turned-off state while the given torque current value iq* vector is set to the negative direction. Therefore, the current of the motor passes through a unidirectional conductive element, for example, a diode in FIG. 21, and the negative current is fed back to the battery pack 61 so as to charge the battery pack 61.

During a process of charging the battery pack 61, the control module 60 outputs a drive signal to control the driver circuit 63 and the driver circuit 63 controls the sinusoidal current outputted by the motor 68, thereby controlling a magnitude of negative torque generated by the motor 68 according to the sinusoidal current. Therefore, when a negative torque current component generated by the motor 68 is fed back to the battery pack 61 through the diode, a magnitude of a current for charging the battery pack 61 may be limited to a current range in which the battery is effectively charged, thereby protecting the battery pack 61 and achieving energy recovery. In this manner, through the negative torque generated in the second control mode, the energy recovery can be achieved, and the braking current and braking time can be precisely controlled.

What is claimed is:
1. A power tool, comprising:
a functional element;
a motor configured to drive the functional element to rotate, wherein the motor comprises a stator and a rotor;
a power supply module configured to supply power to the motor;
a driver circuit electrically connected to the motor and the power supply module and configured to apply a voltage of the power supply module to the motor; and
a control module electrically connected to the driver circuit and configured to output a control signal to the driver circuit to control the driver circuit, wherein the control module is configured to:
control the driver circuit in a first control mode so that a voltage of the motor varies with a position of the rotor of the motor in a square wave when the power tool is in a first operation stage; and
control the driver circuit in a second control mode so that the voltage of the motor varies with the position of the rotor of the motor in a sine wave or a saddle wave when the power tool is in a second operation stage,
wherein the control module is configured to determine that the power tool is in the second operation stage and to be switched from the first control mode to the second control mode when a rotational speed of the motor is less than or equal to a first preset rotational speed threshold and a current of the motor is greater than or equal to a first preset current threshold, and
wherein the control module is configured to determine that the power tool is in the first operation stage and to be switched from the second control mode to the first control mode when the rotational speed of the motor is greater than or equal to a second preset rotational speed threshold and the current of the motor is less than or equal to a second preset current threshold.

2. The power tool of claim 1, wherein the control module is configured to determine whether the power tool is in the first operation stage or the second operation stage according to a load-related parameter of the motor.

3. The power tool of claim 2, wherein the load-related parameter of the motor comprises at least one of the current of the motor, the rotational speed of the motor, a torque of the motor, or an acceleration of the power tool.

4. The power tool of claim 1, wherein the second preset current threshold is less than the first preset current threshold and the second preset rotational speed threshold is greater than the first preset rotational speed threshold.

5. The power tool of claim 1, wherein the first operation stage is a motor driving stage of the power tool and the second operation stage is a motor braking stage of the power tool.

6. The power tool of claim 5, wherein the first operation stage comprises one or more of a light-load operation stage, a medium-load operation stage, or a heavy-load operation stage.

7. The power tool of claim 6, wherein the control module is configured to:
   in the first control mode, output a first PWM control signal to the driver circuit; and
   in the second control mode, output a second PWM control signal to the driver circuit;
   wherein a duty cycle of the second PWM control signal varies with the position of the rotor of the motor.

8. The power tool of claim 7, wherein the control module is configured to:
   perform a switching process before switching from the first control mode to the second control mode; and
   in the switching process, suspend output the first PWM control signal to the driver circuit so that the motor stops driving.

9. The power tool of claim 8, wherein the control module is configured to start to perform the switching process at a preset position of the rotor.

10. The power tool of claim 8, wherein a variation of the rotational speed of the motor before and after the switching process is less than a preset threshold.

11. The power tool of claim 8, wherein the control module is configured to:
    in the switching process, acquire a switched initial duty cycle of the second PWM control signal according to a preset duration, the rotational speed of the motor, the position of the rotor of the motor, and a bus current or bus voltage of the motor.

12. The power tool of claim 11, wherein the preset duration is a duration during which the control module performs the switching process.

13. The power tool of claim 5, wherein the control module is switched to the second control mode from the first control mode during braking.

14. A control method of a power tool comprised of a motor, a driver circuit configured to drive the motor, and a control module configured to control the driver circuit, the control method comprising:
    determining whether the power tool is in a first operation stage or a second operation stage;
    in a case where the power tool is in the first operation stage, controlling the driver circuit in a first control mode so that an input voltage of the motor varies with a position of a rotor of the motor in a square wave; and
    in a case where the power tool is in the second operation stage, controlling the driver circuit in a second control mode so that the input voltage of the motor varies with the position of the rotor of the motor in a sine wave or a saddle wave,
    wherein, in a case where a rotational speed of the motor is greater than or equal to a second preset rotational speed threshold and a current of the motor is less than or equal to a second preset current threshold, the power tool is determined to be in the first operation stage and the control method further comprises switching the control module from the second control mode to the first control mode.

15. The control method of claim 14, wherein determining whether the power tool is in the first operation stage or the second operation stage is based on a load-related parameter of the motor.

16. The control method of claim 15, wherein the load-related parameter of the motor comprises at least one of a current of the motor, a rotational speed of the motor, a torque of the motor, or an acceleration of the power tool.

17. The control method of claim 14, wherein, in a case where a rotational speed of the motor is less than or equal to a first preset rotational speed threshold and a current of the motor is greater than or equal to a first preset current threshold, the power tool is determined to be in the second operation stage and the control method further comprises switching the control module from the first control mode to the second control mode.

* * * * *